US008860920B2

(12) United States Patent
Nishiwaki et al.

(10) Patent No.: US 8,860,920 B2
(45) Date of Patent: Oct. 14, 2014

(54) LIQUID-CRYSTAL DISPLAY DEVICE AND MANUFACTURING METHOD THEREFOR

(75) Inventors: Shogo Nishiwaki, Osaka (JP); Kunihiro Tashiro, Osaka (JP); Yukinobu Nakata, Osaka (JP); Takayuki Hayano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 291 days.

(21) Appl. No.: 13/386,748

(22) PCT Filed: Jul. 23, 2010

(86) PCT No.: PCT/JP2010/062455
§ 371 (c)(1),
(2), (4) Date: Feb. 15, 2012

(87) PCT Pub. No.: WO2011/010730
PCT Pub. Date: Jan. 27, 2011

(65) Prior Publication Data
US 2012/0140157 A1      Jun. 7, 2012

(30) Foreign Application Priority Data

Jul. 24, 2009   (JP) .................................. 2009-173543

(51) Int. Cl.
G02F 1/13        (2006.01)
G02F 1/1345     (2006.01)
G02F 1/1337     (2006.01)
G02F 1/1362     (2006.01)

(52) U.S. Cl.
CPC ..................... G02F 1/133711 (2013.01); G02F 2001/136254 (2013.01)
USPC ............ 349/187; 349/149; 349/152; 349/192

(58) Field of Classification Search
CPC ................ G02F 1/133351; G02F 2001/13775; G02F 2001/136254
USPC ............................ 349/54, 149, 152, 187, 192
See application file for complete search history.

(56) References Cited

U.S. PATENT DOCUMENTS

2003/0162317 A1 *   8/2003   Tanaka et al. .................. 438/48
2007/0035691 A1     2/2007   Sugiura et al.
(Continued)

FOREIGN PATENT DOCUMENTS

JP            2003-248208        9/2003
(Continued)

OTHER PUBLICATIONS

English Translation of the International Preliminary Report and Written Opinion issued in International Application No. PCT/JP2010/062455 dated Feb. 16, 2012.
International Search Report for PCT/JP2010/062455 mailed Oct. 26, 2010.

Primary Examiner — Nathanael R Briggs
(74) Attorney, Agent, or Firm — Nixon & Vanderhye P.C.

(57) ABSTRACT

A method of producing a liquid crystal display device according to the present invention includes: a step of providing a liquid crystal panel (110); a step of, through light irradiation while applying a voltage to a mixture via a check terminal (174) and a check line (172) on a rear substrate (130), forming from the mixture a liquid crystal layer (140) containing a liquid crystal compound and an alignment sustaining layer (150, 160) resulting through polymerization of a photopolymerizable compound; and a step of, after forming the liquid crystal layer (140) and the alignment sustaining layer (150, 160), applying a voltage across the liquid crystal layer (140) from the check terminal (172) to check the liquid crystal panel (110).

10 Claims, 17 Drawing Sheets

(56) References Cited

U.S. PATENT DOCUMENTS

2007/0195217 A1* 8/2007 Miyashita et al. ............ 349/54
2009/0103011 A1   4/2009 Bernatz et al.
2010/0109993 A1* 5/2010 Chang ........................... 345/92

FOREIGN PATENT DOCUMENTS

| JP | 2006-133619 | 5/2006 |
| JP | 2006-243637 | 9/2006 |
| JP | 2009-102639 | 5/2009 |

* cited by examiner

FIG.1
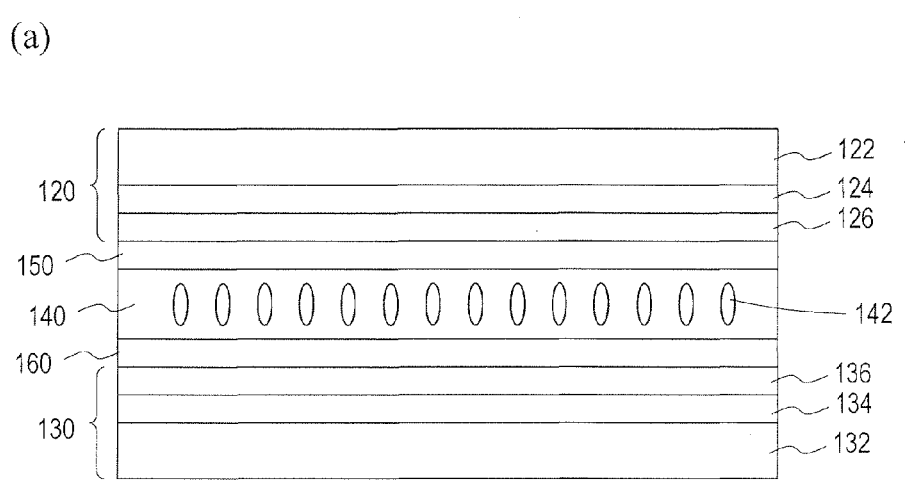
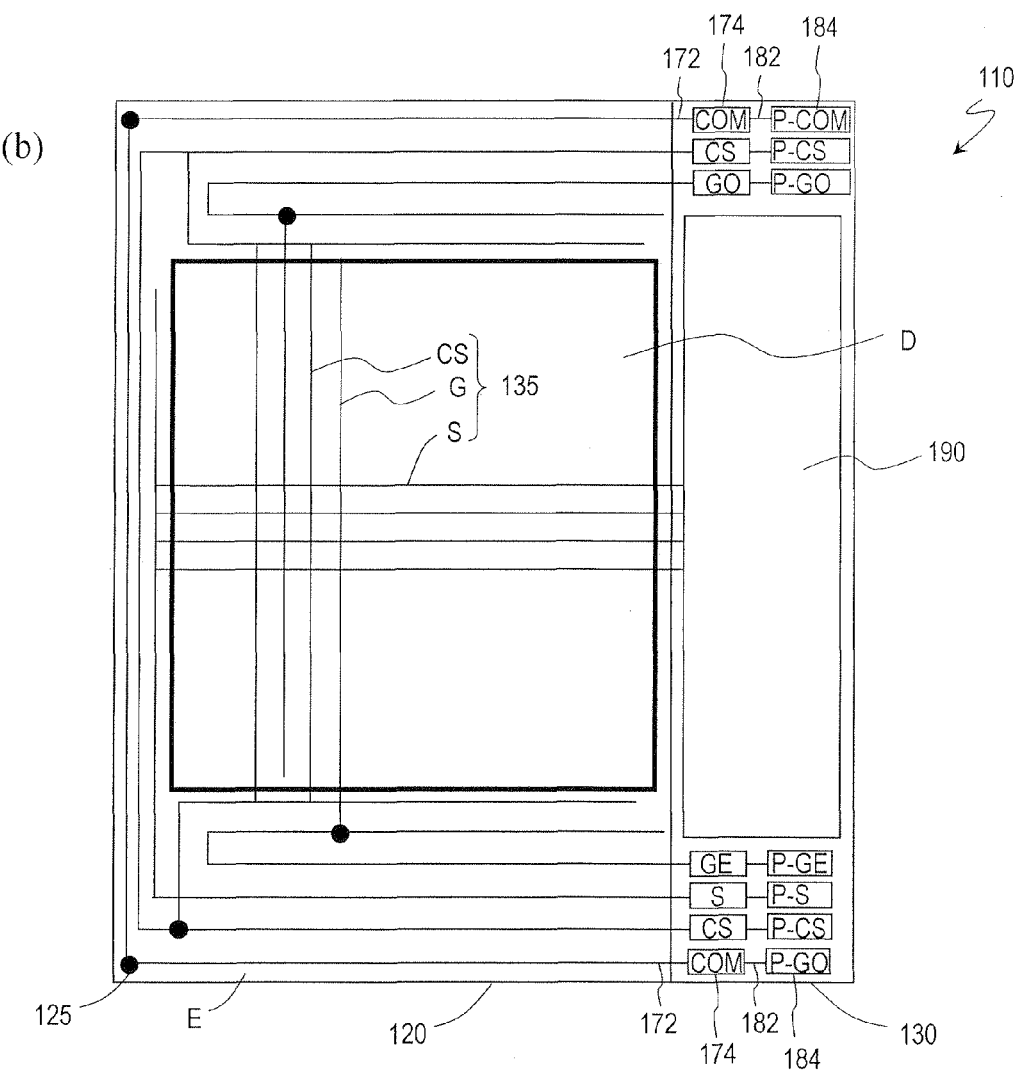

FIG.5B
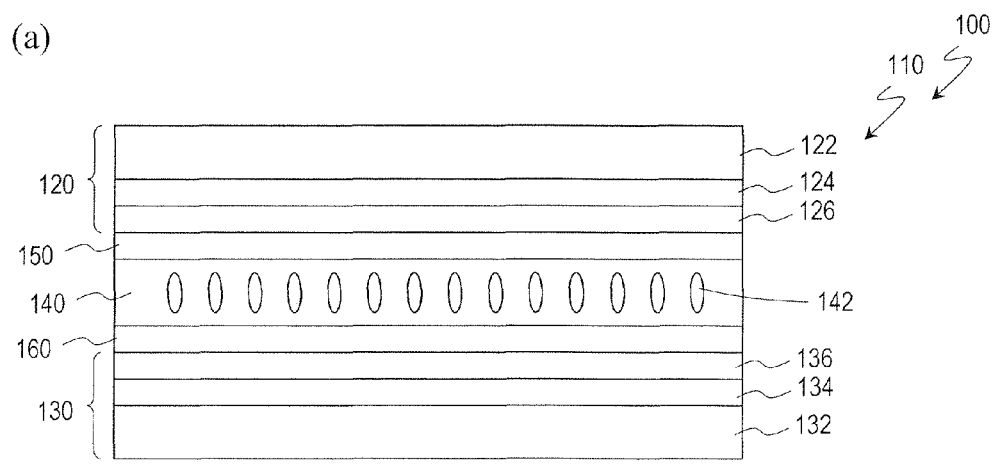
(a)
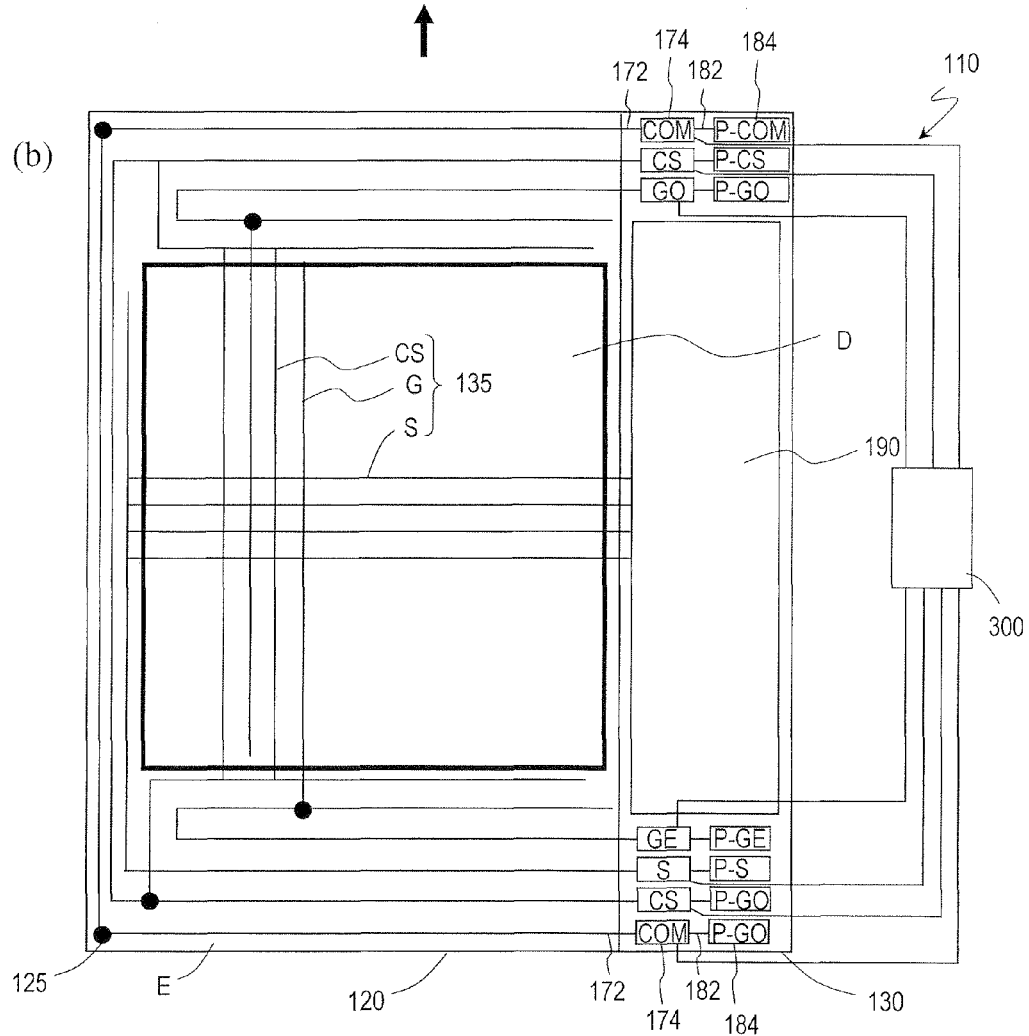
(b)

*FIG.12*
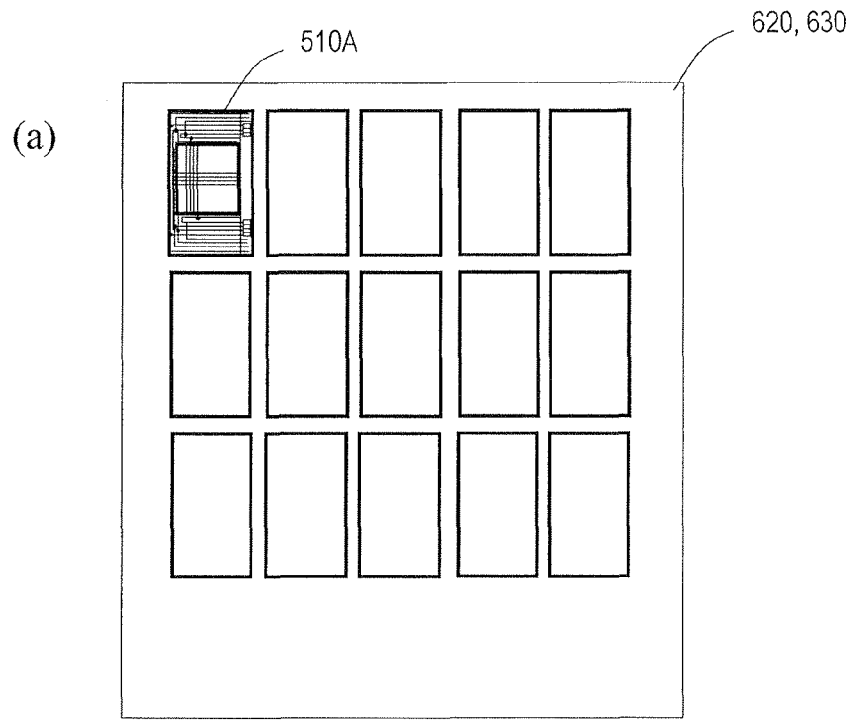
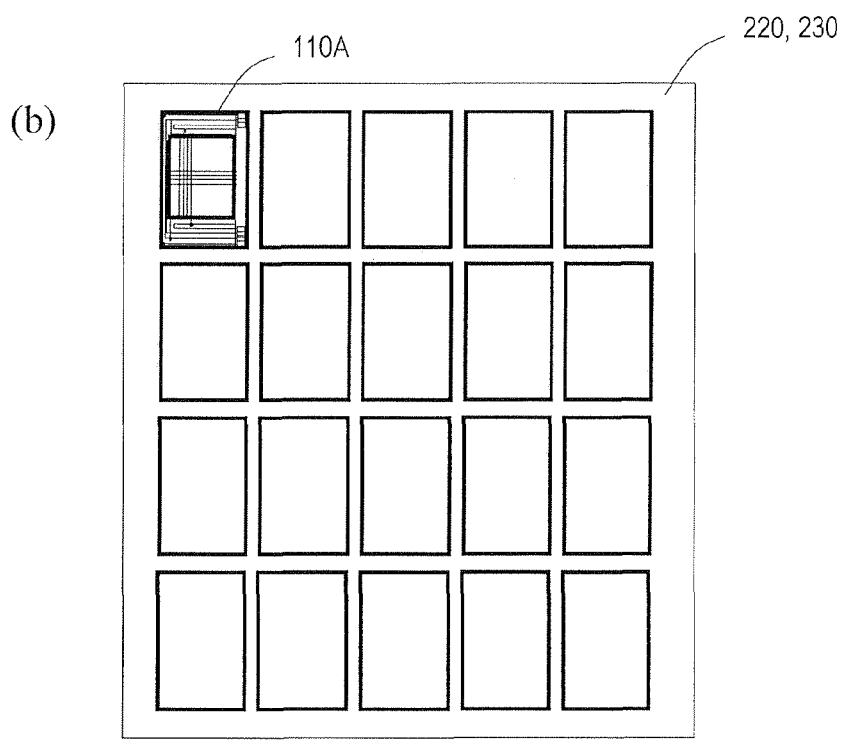

LIQUID-CRYSTAL DISPLAY DEVICE AND MANUFACTURING METHOD THEREFOR

This application is the U.S. national phase of International Application No. PCT/JP2010/062455 filed 23 Jul. 2010 which designated the U.S. and claims priority to JP 2009-173543 filed 24 Jul. 2009, the entire contents of each of which are hereby incorporated by reference.

TECHNICAL FIELD

The present invention relates to a liquid crystal display device having an alignment sustaining layer, and a method of producing the same.

BACKGROUND ART

Liquid crystal display devices are used not only as large-sized television sets, but also as small-sized display devices, e.g., the display sections of mobile phones. Liquid crystal display devices of the TN (Twisted Nematic) mode, which have often been used conventionally, have relatively narrow viewing angles. In recent years, however, liquid crystal display devices with wide viewing angles have been produced, e.g., the IPS (In-Plane Switching) mode and the VA (Vertical Alignment) mode. Among such wide-viewing angle modes, the VA mode is adopted in a large number of liquid crystal display devices because of an ability to realize a high contrast ratio.

As one kind of VA mode, the MVA (Multi-domain Vertical Alignment) mode is known, under which a plurality of liquid crystal domains are created in one pixel region. An MVA-mode liquid crystal display device includes alignment regulating structures provided on the liquid-crystal-layer side of at least one of a pair of opposing substrates, between which a vertical-alignment type liquid crystal layer is interposed. The alignment regulating structures may be linear slits (apertures) or ribs (protruding structures) that are provided on electrodes, for example. The alignment regulating structures provide alignment regulating forces from one side or both sides of the liquid crystal layer, thus creating a plurality of liquid crystal domains (typically four liquid crystal domains) with different alignment directions, whereby the viewing angle characteristics are improved.

Also known as a kind of VA mode is the CPA (Continuous Pinwheel Alignment) mode. In a generic liquid crystal display device of the CPA mode, pixel electrodes of a highly symmetrical shape are provided, and on a counter electrode, protrusions are provided corresponding to the centers of liquid crystal domains. These protrusions are also referred to as rivets. When a voltage is applied, in accordance with an oblique electric field which is created with the counter electrode and a highly symmetrical pixel electrode, liquid crystal molecules take an inclined alignment of a radial shape. Moreover, the inclined alignment of the liquid crystal molecules are stabilized due to the alignment regulating forces of side slopes of the rivets. Thus, the liquid crystal molecules in one pixel are aligned in a radial shape, thereby improving the viewing angle characteristics.

Unlike in a TN-mode liquid crystal display device in which the pretilt directions of liquid crystal molecules are regulated by alignment films, alignment regulating forces are applied to the liquid crystal molecules by linear slits or ribs in an MVA-mode liquid crystal display device, so that the alignment regulating forces to the liquid crystal molecules within a pixel region may differ depending on the distance from a slit or rib, and differences may occur in the response speeds of the liquid crystal molecules within the pixel. Similarly, also in the CPA mode, differences may occur in the response speeds of the liquid crystal molecules within the pixel, and the differences in response speed will be more outstanding as the pixel electrode increases in size.

In the generic VA mode, liquid crystal molecules are aligned in the normal direction of the principal face of an alignment film in the absence of an applied voltage, and when a voltage is applied across the liquid crystal layer, the liquid crystal molecules are aligned in a predetermined direction. On the other hand, in order to improve the response speed of the VA mode as such, conducting a treatment called Polymer Sustained Alignment (hereinafter referred to as the "PSA treatment") is under study (see Patent Documents 1 and 2). In a PSA treatment, while applying a voltage across a liquid crystal layer having a small amount of polymerizable compound (e.g., a photopolymerizable monomer) mixed thereto, polymerization of the polymerizable compound is effected, whereby the alignment state of the liquid crystal molecules is sustained (stored), and a pretilt is conferred such that the liquid crystal molecules are inclined from the normal direction of the principal face of the alignment film even in the absence of an applied voltage.

The liquid crystal display devices of Patent Documents 1 and 2 include an electrode having a minute stripe pattern such that, when a voltage is applied across the liquid crystal layer, the liquid crystal molecules are aligned in parallel to the longitudinal direction of the stripe pattern. In this state, if ultraviolet light is radiated so as to allow the alignment state of the liquid crystal molecules to be sustained (stored), the liquid crystal molecules will thereafter be inclined in the pretilt azimuth from the normal direction of the principal face of the alignment film, even when voltage application is stopped. In this manner, a pretilt is conferred to the liquid crystal molecules in the absence of an applied voltage, thus obtaining an improved response speed. Applicability of a PSA treatment in not only the aforementioned VA mode but also in other modes, e.g., the IPS mode or the TN mode, is also under study (Patent Document 3).

CITATION LIST

Patent Literature

[Patent Document 1] Japanese Laid-Open Patent Publication No. 2006-133619
[Patent Document 2] Japanese Laid-Open Patent Publication No. 2006-243637
[Patent Document 3] Japanese Laid-Open Patent Publication No. 2009-102639

SUMMARY OF INVENTION

Technical Problem

Generally speaking, after a liquid crystal panel is produced, a defect check for the pixels is conducted. In a frame region (non-display region) of a liquid crystal panel, terminals and wiring lines to be used when performing a defect check are provided. In the case of conducting a PSA treatment for such a liquid crystal panel, if the terminals and wiring lines needed for the PSA treatment are merely provided in the frame region, the frame region will increase in area, thus preventing the frame region of the liquid crystal display device from being narrowed.

The present invention has been made in view of the above problems, and an objective thereof is to provide a liquid crystal display device which facilitates narrowing of the frame region, and a method of producing the same.

Solution to Problem

A method of producing a liquid crystal display device according to the present invention comprises: a step of providing at least one liquid crystal panel, the at least one liquid crystal panel having a front substrate, a rear substrate, a mixture interposed between the front substrate and the rear substrate, a plurality of electrodes including a pixel electrode which is provided on the rear substrate, a gate line and a source line provided corresponding to the pixel electrode, and a check terminal electrically connected to the gate line and the source line via a check line, the mixture containing a liquid crystal compound and a photopolymerizable compound; a step of forming from the mixture a liquid crystal layer containing the liquid crystal compound and an alignment sustaining layer resulting through polymerization of the photopolymerizable compound by performing light irradiation while applying a voltage to the mixture via the check terminal and the check line; and a step of, after forming the liquid crystal layer and the alignment sustaining layer, applying a voltage across the liquid crystal layer from the check terminal to check the liquid crystal panel.

In one embodiment, the step of providing the at least one liquid crystal panel comprises a step of producing a plurality of liquid crystal panels, the step of producing the plurality of liquid crystal panels including: a step of providing a first mother substrate which includes the respective front substrates of the plurality of liquid crystal panels; a step of providing a second mother substrate which includes the respective rear substrates of the plurality of liquid crystal panels, the second mother substrate further including an additional terminal provided in a region other than the respective rear substrates of the plurality of liquid crystal panels and an additional line extending from the check terminal of the rear substrate corresponding to at least one liquid crystal panel among the plurality of liquid crystal panels to the additional terminal; and a step of attaching together the first mother substrate and the second mother substrate; and in the step of forming the liquid crystal layer and the alignment sustaining layer, the voltage is applied from the additional terminal.

In one embodiment, in the step of providing the second mother substrate, the additional terminal is electrically connected to the check terminals of the rear substrates of a number of liquid crystal panels among the plurality of liquid crystal panels.

In one embodiment, the method of producing further comprises, before forming the liquid crystal layer and the alignment sustaining layer and after attaching together the first mother substrate and the second mother substrate, a step of removing a portion of the first mother substrate to leave the additional terminal of the second mother substrate exposed.

In one embodiment, the step of producing the plurality of liquid crystal panels comprises, before attaching together the first mother substrate and the second mother substrate, a step of adding the mixture dropwise to at least one of the front substrate and the rear substrate of each of the plurality of liquid crystal panels.

In one embodiment, the method of producing further comprises, after forming the liquid crystal layer and the alignment sustaining layer and before checking the liquid crystal panel, a step of cutting the first mother substrate and the second mother substrate to take out the plurality of liquid crystal panels.

In one embodiment, the step of producing the plurality of liquid crystal panels comprises a step of injecting the mixture in between the front substrate and the rear substrate after attaching together the first mother substrate and the second mother substrate.

In one embodiment, the step of producing the plurality of liquid crystal panels comprises: a step of introducing a sealant on at least one of the front substrate and the rear substrate in a shape that is closed except in an injection inlet, before attaching together the first mother substrate and the second mother substrate; and a step of sealing the injection inlet after injecting the mixture in between the front substrate and the rear substrate.

In one embodiment, the step of producing the plurality of liquid crystal panels comprises, after attaching together the first mother substrate and the second mother substrate and before injecting the mixture between the front substrate and the rear substrate, a step of cutting the first mother substrate and the second mother substrate apart so as to include the front substrate and rear substrate corresponding to a number of liquid crystal panels among the plurality of liquid crystal panels.

In one embodiment, in the step of providing the liquid crystal panel, the liquid crystal panel further has an additional line extending from the check terminal and an additional terminal electrically connected to the additional line; and in the step of forming the liquid crystal layer and the alignment sustaining layer, the voltage is applied from the additional terminal.

In one embodiment, there is a smaller number of additional terminals than the number of check terminals electrically connected to the additional terminals.

A liquid crystal display device according to the present invention comprises: a front substrate; a rear substrate; a liquid crystal layer provided between the front substrate and the rear substrate; a first alignment sustaining layer provided between the front substrate and the liquid crystal layer; a second alignment sustaining layer provided between the rear substrate and the liquid crystal layer; a plurality of electrodes including a pixel electrode provided on the rear substrate; a gate line and a source line provided corresponding to the pixel electrode; a check terminal electrically connected to the gate line and the source line via a check line; and an additional line extending from the check terminal.

In one embodiment, the liquid crystal display device further comprises an additional terminal electrically connected to the additional line.

In one embodiment, the additional line extends to an end of the rear substrate.

Advantageous Effects of Invention

According to the present invention, a liquid crystal display device which facilitates narrowing of the frame region, and a method of producing the same can be provided.

BRIEF DESCRIPTION OF DRAWINGS

FIG. 1 (*a*) is a schematic cross-sectional view showing a first embodiment of a liquid crystal display device according to the present invention; and (*b*) is a schematic plan view.

FIG. 5B (a) and (b) are schematic diagrams corresponding to the flowchart shown in FIG. 4.

FIG. 12 (a) is a schematic diagram showing mother substrates which have been attached together in a production process for the liquid crystal display device shown in FIG. 11; and (b) is a schematic diagram showing mother substrates which have been attached together in a production process for the liquid crystal display device shown in FIG. 8.

DESCRIPTION OF EMBODIMENTS

Figure 2:
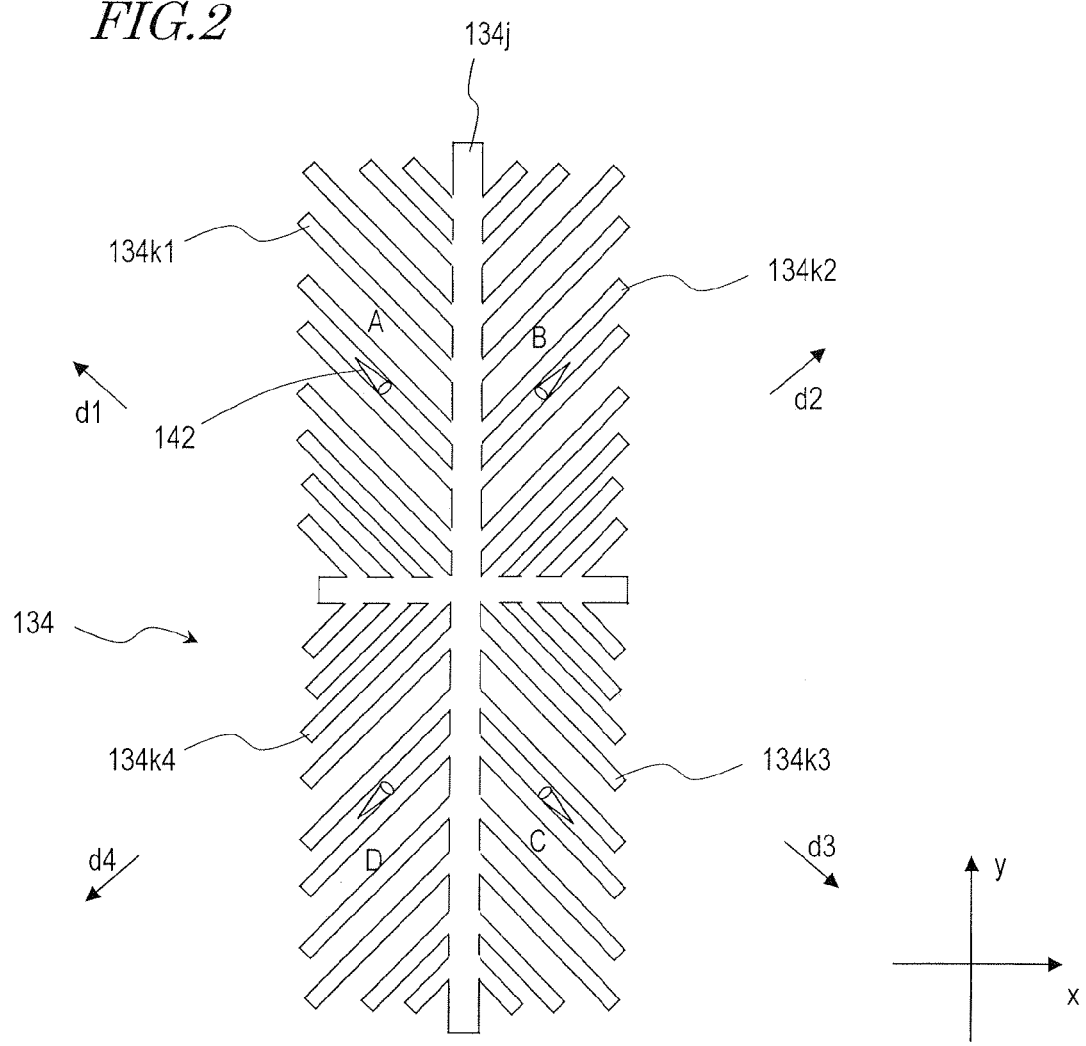
FIG. 2 A schematic diagram showing a rear substrate of a liquid crystal display device shown in FIG. 1.

Hereinafter, with reference to the drawings, embodiments of the liquid crystal display device according to the present invention will be described. However, the present invention is not limited to the following embodiments.

Embodiment 1

Hereinafter, a first embodiment of the liquid crystal display device of the present invention will be described with reference to FIG. 1. FIG. 1(a) shows a schematic cross-sectional view of a liquid crystal display device 100 of the present embodiment. The liquid crystal display device 100 of the present embodiment has a liquid crystal panel 110 which includes: a front substrate 120; a rear substrate 130; a liquid crystal layer 140; an alignment sustaining layer 150 provided between the front substrate 120 and the liquid crystal layer 140; and an alignment sustaining layer 160 provided between the rear substrate 130 and the liquid crystal layer 140.

In the liquid crystal panel 110, the front substrate 120 includes an insulative substrate 122, a counter electrode 124, and an alignment film 126. Although not shown herein, the front substrate 120 may have a color filter layer. The front substrate 120 is also referred to as a counter substrate.

The rear substrate 130 includes an insulative substrate 132, pixel electrodes 134, and an alignment film 136. Although not shown herein, an insulating layer is provided on the rear substrate 130. The rear substrate 130 is also referred to as an active matrix substrate or TFT substrate.

In the liquid crystal panel 110, a plurality of pixels are arranged in a matrix array of a plurality of rows and a plurality of columns. The plurality of pixels include red, green, and blue pixels, each pixel being defined by a pixel electrode 134.

Although not shown herein, a polarizer and a phase plate are provided on each of the front substrate 120 and the rear substrate 130, the two polarizers being placed so as to oppose each other with the liquid crystal layer 140 interposed therebetween. The two polarizers are disposed so that their transmission axes (polarization axes) are orthogonal to each other (so as to be under crossed Nicols relationship), one along the horizontal direction (row direction) and the other along the vertical direction (column direction). The thickness of the liquid crystal layer 140 is essentially constant. Although not shown herein, in the case where the liquid crystal display device 100 is a transmission type or a transmission/reflection dual-use type, the liquid crystal display device 100 may further include a backlight.

The liquid crystal panel 110 operates in a VA mode. The alignment films 126 and 136 are vertical alignment films. The liquid crystal layer 140 is a vertical-alignment type liquid crystal layer. As used herein, a "vertical-alignment type liquid crystal layer" means a liquid crystal layer in which the liquid crystal molecular axes (also referred to as the "axial azimuths") are aligned at angles of about 85° or more relative to the surfaces of the vertical alignment films 126 and 136. The liquid crystal layer 140 contains a nematic liquid crystal material having negative dielectric anisotropy, and performs displaying in a normally-black mode in cooperation with polarizers which are placed in crossed Nicols.

When no voltage is applied across the liquid crystal layer 140, liquid crystal molecules 142 in the liquid crystal layer 140 are aligned essentially in parallel to the normal directions of the principal faces of the alignment films 126 and 136. When a voltage which is higher than a predetermined voltage is applied across the liquid crystal layer 140, the liquid crystal molecules 142 in the liquid crystal layer 140 are aligned essentially in parallel to the principal faces of the alignment films 126 and 136. When a relatively high voltage is applied across the liquid crystal layer 140, the liquid crystal molecules 142 are symmetrically aligned within a pixel or within a specific region of a pixel, whereby the viewing angle characteristics are improved. Although it is illustrated herein that the front substrate 120 and the rear substrate 130 respectively have the alignment films 126 and 136, at least one of the front substrate 120 and the rear substrate 130 may have a corresponding alignment film 126 or 136. However, from the standpoint of alignment stability, it is preferable that both of the front substrate 120 and the rear substrate 130 have their respective alignment films 126 and 136.

The alignment sustaining layers 150 and 160 contain particles of a polymerization product with a particle size of 50 nm or less. This polymerization product may grow to a particle size of 1 μm to 5 μm. In the liquid crystal panel 110, the liquid crystal layer 140 and the alignment sustaining layers 150 and 160 are formed from a mixture containing a liquid crystal compound and a photopolymerizable compound. By irradiating the mixture interposed between the front substrate 120 and the rear substrate 130 with light (which typically is ultraviolet light) while applying a voltage thereto, the photopolymerizable compound becomes polymerized to form the alignment sustaining layers 150 and 160, and concurrently, the liquid crystal layer 140 containing the liquid crystal compound is formed. Since the alignment directions of the liquid crystal molecules 142 in the liquid crystal layer 140 are sustained (stored) owing to the alignment sustaining layers 150 and 160, even when voltage application is stopped, the liquid crystal molecules 142 in the liquid crystal layer 140 will be slightly inclined from the normal directions of the principal faces of the substrates 120 and 130. As a result, the response speed of the liquid crystal molecules 142 is improved. In the following descriptions of the present specification, forming the liquid crystal layer 140 and the alignment sustaining layers 150 and 160 through light irradiation while applying a voltage in this manner may be referred to as a "PSA treatment".

FIG. 1(b) shows a schematic plan view of the liquid crystal panel 110. In the liquid crystal panel 110, the rear substrate 130 has a principal face area which is greater than that of the front substrate 120. For example, the front substrate 120 and the rear substrate 130 are both rectangular, such that each longer side of the rear substrate 130 is substantially equal in length to each longer side of the front substrate 120, and that each shorter side of the rear substrate 130 has a longer length than that of each shorter side of the front substrate 120. The liquid crystal panel 110 has a display region D and a frame region (non-display region) E which surrounds the display region D. The display region D is a portion of a region where the front substrate 120 and the rear substrate 130 overlap. The liquid crystal panel 110 as such is suitably used for small-sized display devices such as mobile phones and digital still cameras.

Although not shown in FIG. 1(b) in order to avoid unnecessary complexity of the figure, pixel electrodes 134 (see FIG. 1(a)) which are arranged in a matrix array, and thin film transistors (Thin Film Transistors: TFTs) corresponding to the respective pixel electrodes 134, are provided in the display region D of the rear substrate 130. The pixel electrodes 134 are made of an electrically conductive material having a relatively high transmittance, e.g., ITO or IZO, for example. In the display region D of the rear substrate 130, gate lines G and source lines S are provided, each gate line G and source line S corresponding to a pixel electrode 134. The gate of a TFT is electrically connected to a gate line G. The source of a TFT is electrically connected to a source line S. The drain of a TFT is electrically connected to a pixel electrode 134.

In the liquid crystal panel 110, storage capacitor lines CS are provided in parallel to the gate lines G in the display region D of the rear substrate 130. The storage capacitor lines CS suppress decreases in the potentials of the pixel electrodes 134. In the following descriptions of the present specification, the gate lines G, the source lines S, and the storage capacitor lines CS may be collectively denoted as wiring lines 135. Note that the gate lines G and the storage capacitor lines CS are produced through the same steps and from the same material, such as Al, Ti, or Mo, and may also be referred to as a gate layer. The source lines S are made from a material such as Al, Ti, or Mo, and may also be referred to as a source layer.

The counter electrode 124 is provided in the display region D of the front substrate 120. In the liquid crystal panel 110, a wiring line which is electrically connected to the counter electrode 124 of the front substrate 120 is provided on the rear substrate 130, so that a voltage to be applied to the counter electrode 124 of the front substrate 120 is supplied from the rear substrate 130. In the following descriptions, the wiring line which provides electrical connection from the rear substrate 130 to the counter electrode 124 of the front substrate 120 may be denoted as the wiring line 125.

On the rear substrate 130 of the liquid crystal panel 110, a driver 190 is provided in a frame region E. From the driver 190, gate signals, source signals, storage capacitor signals, and counter signals are supplied to the gate lines G, the source lines S, the storage capacitor lines CS, and the counter electrode 124, respectively. The driver 190 appears rectangular when viewed from the normal direction of the principal face of the liquid crystal panel 110, and the driver 190 is disposed so that its longer sides and shorter sides are parallel to the longer sides and shorter sides of the rear substrate 130, respectively.

After the liquid crystal panel 110 is fabricated, a defect check for the pixels is performed. The liquid crystal panel 110 includes terminals 174 which are electrically connected to the wiring lines 125 and 135 via wiring lines 172. The wiring lines 172 and the terminals 174 are provided in the frame region E of the rear substrate 130. In a defect check, a voltage which is generated by a signal generator (not shown) is applied via the terminals 174 in order to check whether the pixels operate normally or not. Since the liquid crystal panel 110 is of a normally-black mode, if a pixel is operating normally, the pixel will appear lit with voltage application. In the following descriptions of the present specification, the terminals 174 may be referred to as check terminals, and the wiring lines 172 as check lines. Specifically, the check terminals 174 include: a terminal GO to which a voltage for the gate lines G in the odd rows is applied; a terminal GE to which a voltage for the gate lines G in the even rows is applied; a terminal S to which a voltage for the source lines S is applied; terminals CS to which a voltage for the storage capacitor lines CS is applied; and terminals COM to which a voltage for the counter electrode 124 is applied. Note that the terminal GO corresponding to the gate lines G in the odd rows and the terminal GE corresponding to the gate lines G in the even rows are provided as check terminals 174 for the gate lines G, such that a leak between gate lines G can be detected by alternately applying voltages to the terminal GO and the terminal GE.

Prior to a defect check, a PSA treatment is performed for the liquid crystal panel 110. In the PSA treatment, voltage application is performed via the check terminals 174 and the check lines 172. Herein, the liquid crystal panel 110 further includes terminals 184 which are electrically connected to the check terminals 174 via wiring lines 182 different from the check lines 172, so that voltages are applied at the terminals 184. For example, voltage application is performed while allowing a probe of a signal generator (not shown) to be efficiently in contact with the terminals 184 by utilizing a jig.

The wiring lines 182 and the terminals 184 are provided in the frame region E of the rear substrate 130. In the following descriptions of the present specification, the terminals 184 may be referred to as additional terminals, and the wiring lines 182 as additional lines. The additional lines 182 extend from the check terminals 174 to the additional terminals 184; herein, the additional lines 182 connect the check terminals 174 to the additional terminals 184 over shortest possible distances.

Specifically, the additional terminals 184 include: a terminal P-GO to which a voltage for the gate lines G in the odd rows is applied; a terminal P-GE to which a voltage for the gate lines G in the even rows is applied; a terminal P-S to which a voltage for the source lines S is applied; terminals P-CS to which a voltage for the storage capacitor lines CS is applied; and terminals P-COM to which a voltage for the counter electrode 124 is applied. The additional terminals 184, i.e., the terminals P-GO, P-GE, P-S, P-CS, and P-COM are electrically connected to the check terminals 174, i.e., the terminals GO, GE, S, CS, and COM, respectively.

Herein, the terminals P-GO and P-GE are provided corresponding to the terminals GO and GE because, as mentioned above, the terminals GO and GE are provided as check terminals 174 corresponding to the gate lines G. However, a single terminal which is electrically connected to the terminals GO and GE may be provided as an additional terminal 184 corresponding to the gate lines G. In the liquid crystal panel 110, the check terminals 174, the additional terminals 184, and the driver 190 are provided along one side of the rectangular rear substrate 130.

The check lines 172 and the additional lines 182 are made of materials composing the gate layer or the source layer, e.g., Al, Ti, or Mo. Unless the voltage across the liquid crystal layer 140 becomes lowered due to signal deterioration, it is preferable that the widths of the check lines 172 and the additional lines 182 are as small as possible.

The additional terminals 184 may be formed through the same steps as the gate layer, the source layer, or the pixel electrodes 134, from the material composing the gate layer or the source layer, e.g., Al, Ti, or Mo, or from the ITO or IZO which is used for the pixel electrodes 134. Note that misalignments between the substrates and a jig can be suppressed when the additional terminals 184 are sized 1200 μm×1800 μm to 1800 μm×1800 μm. Depending on the jig alignment method and the shape and size of the probe tip, the additional terminals 184 may have even smaller sizes. Herein, the check terminals 174 are sized so as to be smaller than the additional terminals 184. As will be described later, a plurality of liquid crystal panels 110 can be integrally formed from mother substrates; in this case, voltage application at the additional terminals 184 is integrally performed for the plurality of liquid crystal panels 110, whereas voltage application at the check terminals 174 is performed for the liquid crystal panels 110 having been separated from the mother substrates. Since the liquid crystal panel 110 is smaller than the mother substrates, alignment between the check terminals 174 and the probe is easily performed even if the check terminals 174 have small sizes.

FIG. 2 shows a pixel electrode 134. The pixel electrode 134 includes a cross-shape stem 134j, and branches 134k1 to 134k4 extending from the stem 134j in four different directions d1 to d4. Such a structure of the pixel electrode 134 is also called a fishbone structure. Note that the stem 134j extends along the x direction and the y direction. For example, the stem 134j has a width of 3 μm. Moreover, the branches 134k1, 134k2, 134k3, and 134k4 have a width of 3 μm, and any interspace therebetween (i.e., the width between branches 134k1 to 134k4) is 3 μm. Defining the horizontal direction (right-left direction) on the display screen (plane of the figure) as a reference of the azimuthal direction, and defining the leftwise rotation as positive (i.e., if the display surface were a clock face, the 3 o'clock direction would be an azimuth angle of 0°, and the counterclockwise would be positive), the directions d1 to d4 are, 135°, 45°, 315°, and 225°, respectively.

When a voltage is applied across the liquid crystal layer 140 in the liquid crystal panel 110, the liquid crystal molecules 142 are aligned in parallel to the directions in which the corresponding branches 134k1 to 134k4 extend, as shown in FIG. 2. The liquid crystal layer 140 has a liquid crystal domain A formed by the branch 134k1, a liquid crystal domain B formed by the branch 134k2, a liquid crystal domain C formed by the branch 134k3, and a liquid crystal domain D formed by the branch 134k4. When no voltage is applied across the liquid crystal layer 140 or the applied voltage is relatively low, the liquid crystal molecules 142 are aligned perpendicular to the principal faces of alignment films which are not shown, except in the neighborhood of the pixel electrode 134. On the other hand, when a predetermined voltage is applied across the liquid crystal layer 140, the liquid crystal molecules 142 are aligned along the directions d1 to d4 in which the branches 134k1, 134k2, 134k3, and 134k4 extend.

In the present specification, the alignment direction of liquid crystal molecules at the center of each liquid crystal domain A to D is referred to as a reference alignment direction, and, within the reference alignment direction, an azimuth angle component that is in a direction from the rear face toward the front face along the major axis of the liquid crystal molecules (i.e., an azimuth angle component as projected onto the principal face of an alignment film) is referred to as a reference alignment azimuth. The reference alignment azimuth characterizes its corresponding liquid crystal domain, and predominantly affects the viewing angle characteristics of the liquid crystal domain. When the horizontal direction (right-left direction) on the display screen (plane of the figure) is defined as a reference of the azimuthal direction and the leftwise rotation is defined as positive, the reference alignment azimuths of the four liquid crystal domains A to D are set to be four azimuths such that the difference between any two azimuths is substantially equal to an integer multiple of 90°. Specifically, the reference alignment azimuths of the liquid crystal domains A, B, C, and D are, respectively, 315°, 225°, 135°, and 45°. Since the liquid crystal molecules 142 are thus aligned in four different azimuths, the viewing angle characteristics are improved.

Figure 3:
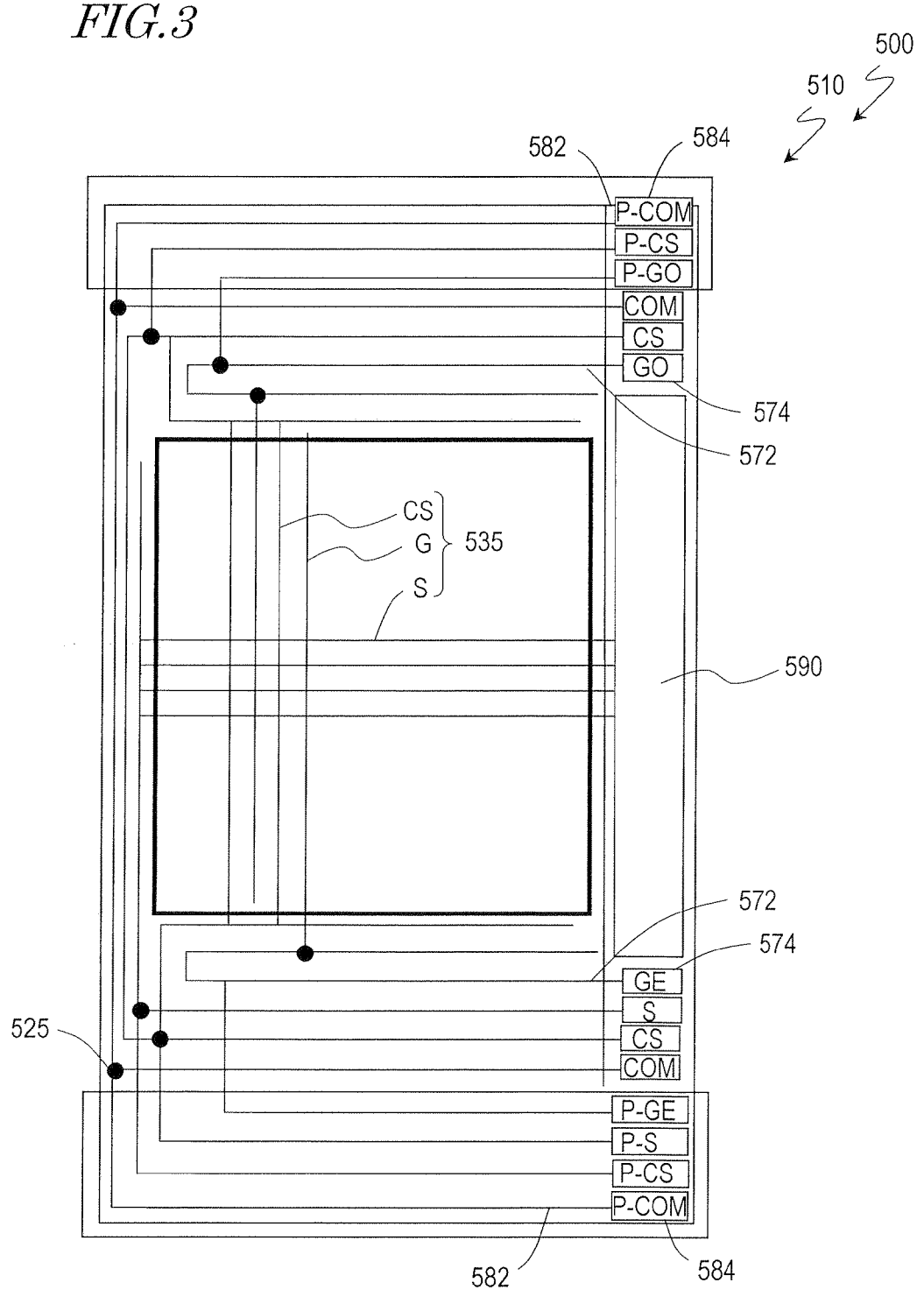
FIG. 3 A schematic diagram showing a liquid crystal display device of Comparative Example 1.

Hereinafter, advantages of the liquid crystal display device 100 of the present embodiment over a liquid crystal display device of Comparative Example 1 will be described. First, a liquid crystal display device 500 of Comparative Example 1 will be described with reference to FIG. 3.

In a liquid crystal display device 500 of the liquid crystal panel 510 of Comparative Example 1, a driver 590 is provided in the frame region. As viewed from the normal direction of the principal face of the liquid crystal panel 510, the driver 590 appears rectangular, and the driver 590 is disposed so that its longer sides and shorter sides are parallel to the longer sides and shorter sides of the rear substrate, respectively.

In the liquid crystal panel 510, check terminals 574 which are electrically connected to wiring lines 525 and 535 via check lines 572 are provided at the sides of the driver 590. Moreover, additional lines 582 are provided so as to extend outward from the check lines 572, and accordingly, additional terminals 584 which are electrically connected to the additional lines 582 are provided outside of the check terminals 574. Thus, in the liquid crystal display device 500, the additional lines 582 extend from the check lines 572, and the driver 590, the check terminals 574, and the additional terminals 584 are arranged in one row along a longer side of the rear substrate 530. This causes the frame region of the liquid crystal panel 510 to be expanded, thus making it impossible to realize a small-sized liquid crystal panel 510. On the other hand, as shown in FIG. 1(b), in the liquid crystal panel 110, the additional lines 182 extend from the check terminals 174 to the additional terminals 184, and the check terminals 174 and the additional terminals 184 are arranged along shorter sides of the rear substrate 130. This makes it possible to narrow the frame region of the liquid crystal panel 110, whereby a small-sized liquid crystal panel 110 can be realized.

Figure 4:
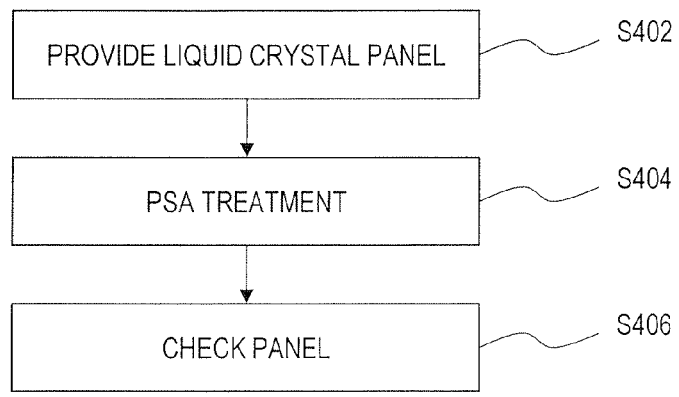
FIG. 4 A flowchart showing production steps for the liquid crystal display device shown in FIG. 1.

Hereinafter, with reference to FIG. 4, FIG. 5A, and FIG. 5B, a method of producing the liquid crystal display device 100 will be described. In order to avoid unnecessary complexity of descriptions, a method of producing a single liquid crystal display device 100 will be described herein.

Figure 5A:
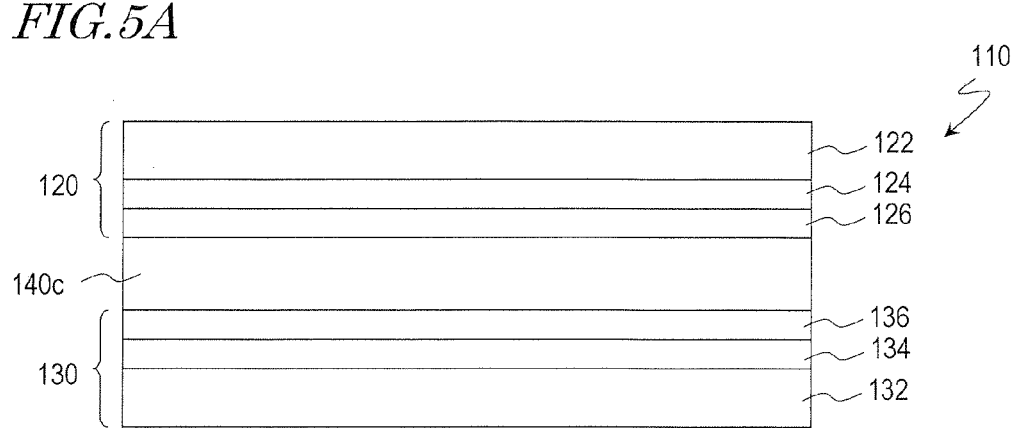
FIG. 5A A schematic diagram corresponding to the flowchart shown in FIG. 4.

First, at S402, a liquid crystal panel 110 is provided as shown in FIG. 5A. Herein, the liquid crystal panel 110 includes a front substrate 120, a rear substrate 130 opposing the front substrate 120, and a mixture 140c interposed between the front substrate 120 and the rear substrate 130. Although not shown in FIG. 5A, as has been described earlier with reference to FIG. 1(b), a wiring line 125 is provided on the front substrate 120, and check terminals 174 which are electrically connected to wiring lines 135 via the check lines 172 are provided on the rear substrate 130. On the rear substrate 130, additional terminals 184 which are electrically connected to the check terminals 174 via additional lines 182 are provided. Note that the additional lines 182 and the additional terminals 184 may be formed through similar steps to and from the same materials as those of the check lines 172 and the check terminals 174. For example, the check lines 172, the check terminals 174, the additional lines 182, and the additional terminals 184 may be formed of a gate layer including gate lines G and storage capacitor lines CS, or of a source layer including source lines S, or alternatively formed through the same steps and from the same material as the pixel electrodes 134.

The mixture 140c contains a liquid crystal compound and a photopolymerizable compound. Herein, as the photopolymerizable compound, a monomer being capable of polymerization and having one or more ring structures or condensed ring structures and two functional groups directly bound to the aforementioned ring structure(s) or condensed ring structure(s) is used. For example, the photopolymerizable monomer is selected from among those which are represented by general formula (I) below.

$$P^1-A^1-(Z^1-A^2)_n-P^2 \quad (1)$$

In general formula (I), $P^1$ and $P^2$ are functional groups which each independently of the other are an acrylate, methacrylate, vinyl, vinyloxy, or epoxy group; $A^1$ and $A^2$ are ring structures which each independently of the other represent a 1,4-phenylene or naphthalene-2,6-diyl group; $Z^1$ is a —COO— or —OCO— group or a single bond; and n is 0, 1, or 2.

$P^1$ and $P^2$ are preferably acrylate groups; $Z^1$ is preferably a single bond; and n is preferably 0 or 1. Preferable monomers are compounds represented by the following formula, for example.

[Formula 1]

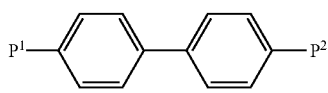

(Ia)

(Ib)

-continued

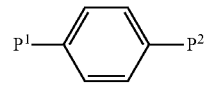

(Ic)

In structural formulae (1a) to (1c), $P^1$ and $P^2$ are as described with respect to general formula (1), where particularly preferable $P^1$ and $P^2$ are acrylate groups. Among the aforementioned compounds, those which are very preferable are compounds represented by structural formula (1a) and structural formula (1b), where the compound of structural formula (1a) is particularly preferable. As a method of introducing the mixture 140c in between the front substrate 120 and the rear substrate 130 of the liquid crystal panel 110, dropwise injection of the mixture 140c may be performed, or dip injection of the mixture 140c may be performed.

Next, at S404, as shown in FIG. 5B(a), ultraviolet light is radiated while applying voltages to the mixture 140c from the additional terminals 184 via the additional lines 182, the check terminals 174, and the check lines 172. Herein, a voltage is applied between the counter electrode 124 and the pixel electrodes 134, and the liquid crystal panel 110 is irradiated with light. The voltage application is conducted as follows. For example, while continuously applying a gate voltage of 10 V to the gate lines G of the liquid crystal panel 110 in order to maintain the TFT provided for each pixel in an ON state, a data voltage of 5 V is applied to all of the source lines S, and rectangular waves with an amplitude of 10 V (maximum 10 V and minimum 0 V) are applied to the counter electrode 124. As a result, an AC voltage of ±5 V is applied between the counter electrode 124 and the pixel electrodes 134. Thus, a higher voltage than that for displaying the highest gray scale level in the usual displaying by the liquid crystal display device is applied between the counter electrode 124 and the pixel electrodes 134. When applying a voltage to the rear substrate 130, the voltage to be applied to the gate lines G may be made higher than the voltage to the source lines S (i.e., the voltage on the pixel electrodes 134), whereby disorder in the liquid crystal alignment is reduced and a display quality with little coarseness can be obtained. Conversely, if the gate voltage is made lower than the source voltage, the pixels may become floating (unstable voltage), in which case the liquid crystal alignment is also likely to become unstable, thus inducing coarseness.

With such voltage application, ultraviolet light (e.g., i-line with a wavelength of 365 nm, about 5.8 mW/cm$^2$) is radiated for about 3 to 5 minutes. With this irradiation, the photopolymerizable compound within the mixture 140c is polymerized to form the alignment sustaining layers 150 and 160, and also the liquid crystal layer 140 containing the liquid crystal compound is formed. As a result, the liquid crystal molecules 142 will have a pretilt angle of 0.1° to 5°. Note that, in the case where a color filter layer is provided on the front substrate 120, the intensity of the wavelength reaching the mixture 140c will differ depending on the pixel color, and therefore light irradiation is conducted through the rear substrate 130.

Thereafter, as necessary, ultraviolet light of about 1.4 mW/cm$^2$ may be radiated under no applied voltage for about 1 to 2 hours by using black light, for example. As a result, the photopolymerizable monomer remaining in the liquid crystal layer 140 after the earlier irradiation is further polymerized, whereby the photopolymerizable monomer concentration is reduced. This irradiation is also conducted through the rear substrate 130. Via this irradiation, the photopolymerizable monomer remaining in the liquid crystal layer 140 is adsorbed or chemical bonded onto the alignment sustaining layers 150 and 160, and also polymerization occurs between photopolymerizable monomers; this makes it possible to reduce the photopolymerizable monomer remaining in the liquid crystal layer 140. If there were a lot of remaining photopolymerizable monomers, photopolymerizable monomers remaining in the liquid crystal layer in small amounts would polymerize at a further slower pace during the operation of the liquid crystal display device, thus inducing image sticking. However, conducting irradiation in the above manner can prevent image sticking. As compared to the aforementioned ultraviolet light which is radiated under an applied voltage, the ultraviolet light to be radiated under no applied voltage has a low illuminance and receives a generally long irradiation time. The above series of steps may also be referred to as a "PSA treatment".

Next, at S406, as shown in FIG. 5B(*b*), a voltage is applied across the liquid crystal layer 140 at the check terminals 174 in order to check for pixel defects. For example, a voltage generated by a signal generator 300 is applied at the check terminals 174, and absence or presence of pixel defects in the liquid crystal panel 110 is checked. Thereafter, a backlight (not shown), a driver 190 (see FIG. 1(*b*)), and the like may be mounted to the liquid crystal panel 110, as necessary. In this manner, the liquid crystal display device 100 can be produced.

In the liquid crystal panel 110 shown in FIG. 1(*b*), a plurality of kinds of signals are output from the one driver 190, and the check terminals 174, the additional terminals 184, and moreover, the driver 190 are provided along one side of the rectangular rear substrate 130; however, the present invention is not limited thereto.

Figure 6A:
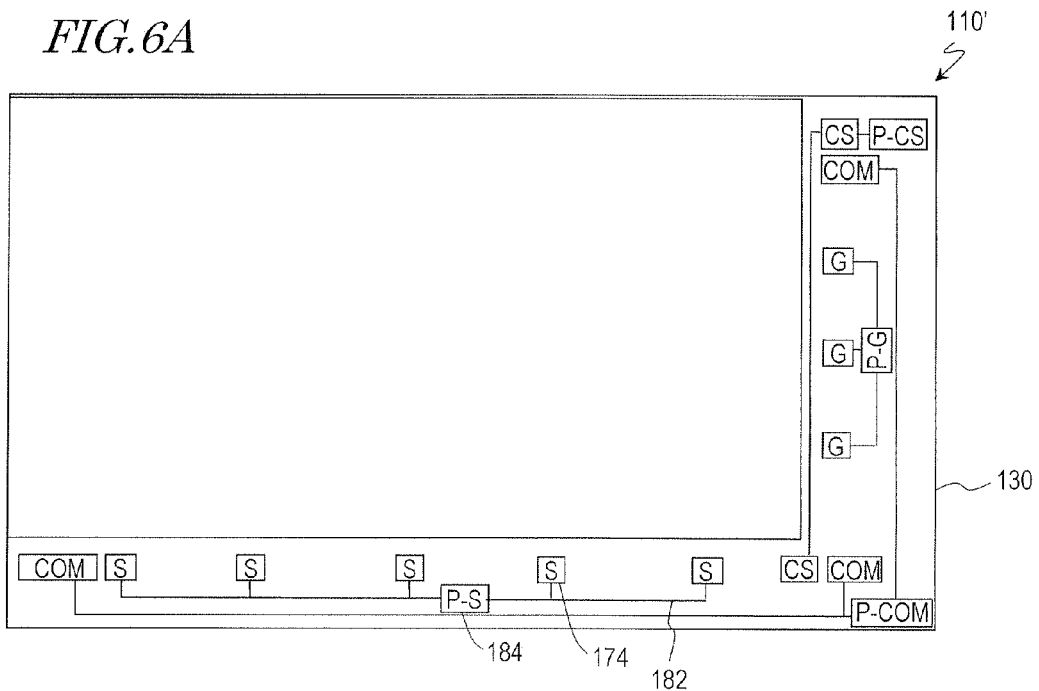
FIG. 6A A schematic diagram showing a variant of the first embodiment of the liquid crystal display device of the present invention.

FIG. 6A shows a schematic plan view of a liquid crystal panel 110'. The liquid crystal panel 110' is used for a relatively large-sized display device, e.g., a PC monitor, for example. In order to avoid complexity of the figure, the wiring lines 135 and the check lines 172 are omitted from FIG. 6A. Although not shown in FIG. 6A, a plurality of gate drivers, source drivers, and the like are provided on the liquid crystal panel 110', these drivers being provided along one longer side and along one shorter side of the liquid crystal panel 110'.

In the liquid crystal panel 110', additional terminals 184 are provided further outside of check terminals 174, and additional lines 182 extend from the check terminals 174 to the additional terminals 184. The check terminals 174 are provided in the neighborhood of each of a longer side and a shorter side of the rectangular rear substrate 130. Specifically, a terminal P-G to which a voltage for the gate lines G is applied is provided in the neighborhood of a shorter side of the rear substrate 130, and a terminal P-S is provided in the neighborhood of a longer side of the rear substrate 130. Terminals P-COM and P-CS are provided in the neighborhoods of corners of the rear substrate 130. Thus, in the liquid crystal panel 110', the check terminals 174, the additional terminals 184, and the drivers (not shown in FIG. 6A) are provided along two sides of the rectangular rear substrate 130.

In the liquid crystal panel 110', as many check terminals 174 are provided as there are drivers. For example, in the 8 inch liquid crystal panel 110, five source drivers are provided and five terminals S are provided corresponding to the five source drivers. Since signals for applying a voltage across the entire plane of the liquid crystal panel 110' are input at the additional terminals 184, each additional terminal 184 may be electrically connected to more than one check terminals 174. Thus, in the liquid crystal panel 110', there are fewer additional terminals 184 than there are check terminals 174, whereby the construction of a jig to be used for the PSA treatment can be simplified, and thus the jig can be produced at low cost.

Moreover, a switching element(s) (not shown) may be provided on an additional line(s) 182 interconnecting a check terminal(s) 174 and an additional terminal(s) 184. The switching element(s) is/are a TFT(s) formed through similar steps to those for the TFTs provided in the display region, for example. A switch signal(s) may be input to the gate(s) of the switching element(s) to allow the additional terminal(s) 184 to be electrically connected to the check terminal(s) 174 during the PSA treatment, while the additional terminal(s) 184 may be kept insulated from the check terminal(s) 174 by the switching element(s) other than during the PSA treatment.

In the liquid crystal panel 110' shown in FIG. 6A, the additional terminals 184 are provided in the neighborhoods of both a shorter side and a longer side of the rear substrate 130; however, the present invention is not limited thereto. The additional terminals 184 may be provided in the neighborhood of either one of a shorter side and a longer side.

Figure 6B:
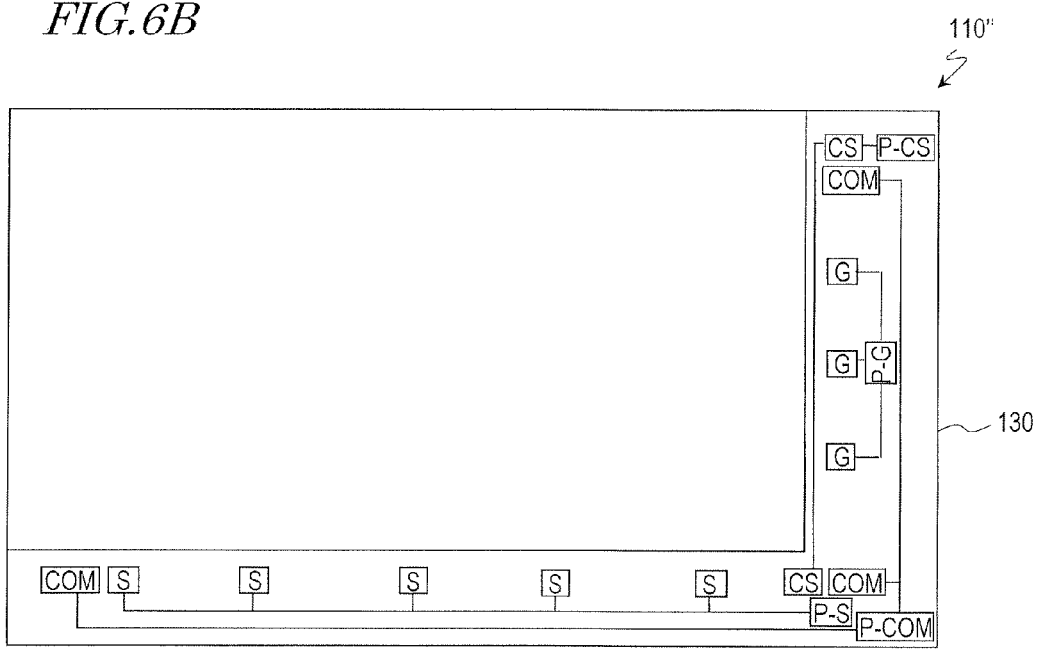
FIG. 6B A schematic diagram showing another variant of the first embodiment of the liquid crystal display device of the present invention.

FIG. 6B shows a schematic plan view of a liquid crystal panel 110" of the liquid crystal display device 100. In the liquid crystal panel 110", specifically, terminals P-G to which a voltage for the gate lines G is applied, P-S, P-COM, and P-CS are all provided in the neighborhood of a shorter side of the rear substrate 130. Therefore, the terminals P-G, P-S, P-COM, and P-CS are disposed at relatively close distances to one another, thus allowing the mechanism of fixing a probe and the panel during the PSA treatment to be simplified.

Figure 6C:
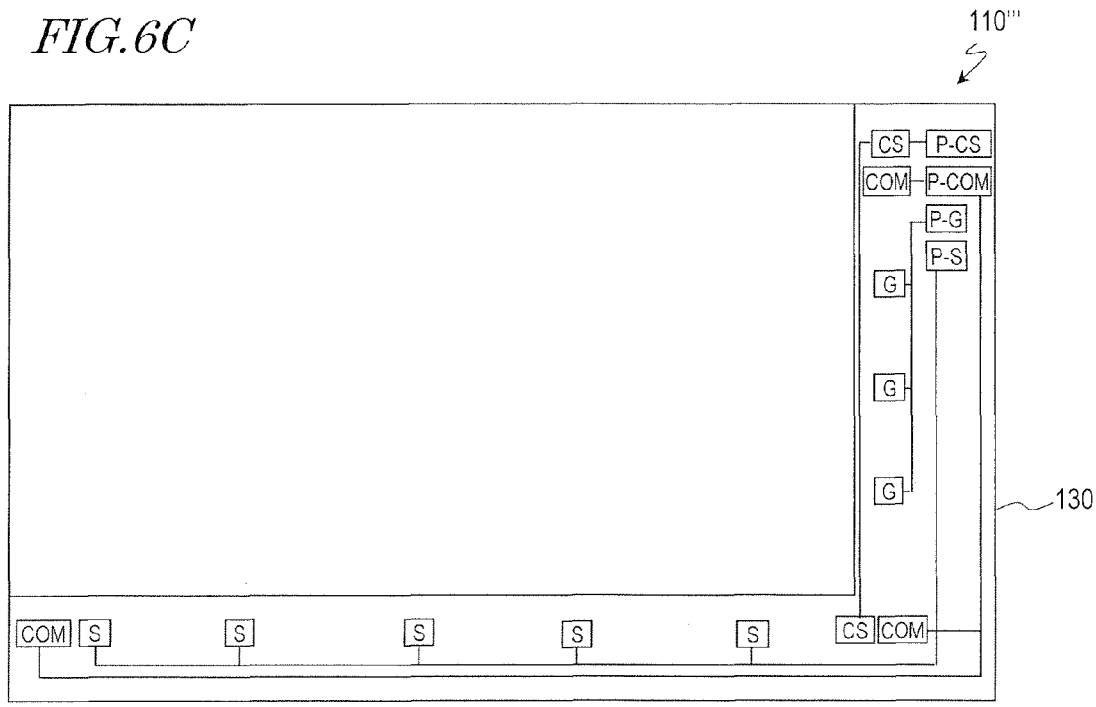
FIG. 6C A schematic diagram showing still another variant of the first embodiment of the liquid crystal display device of the present invention.

Moreover, as shown in FIG. 6C, the terminals P-G, P-S, P-COM, and P-CS may be arranged in one row in the neighborhood of a shorter side of the rear substrate 130. This allows for further simplification of the mechanism of fixing a probe and the panel during the PSA treatment. Although FIG. 6C illustrates that the terminals P-COM are electrically connected to all terminals COM, the terminals P-COM may be electrically connected to some of the terminals COM, because a counter signal to be applied during the PSA treatment has a relatively low frequency; this will permit narrowing of the frame region.

Figure 7:
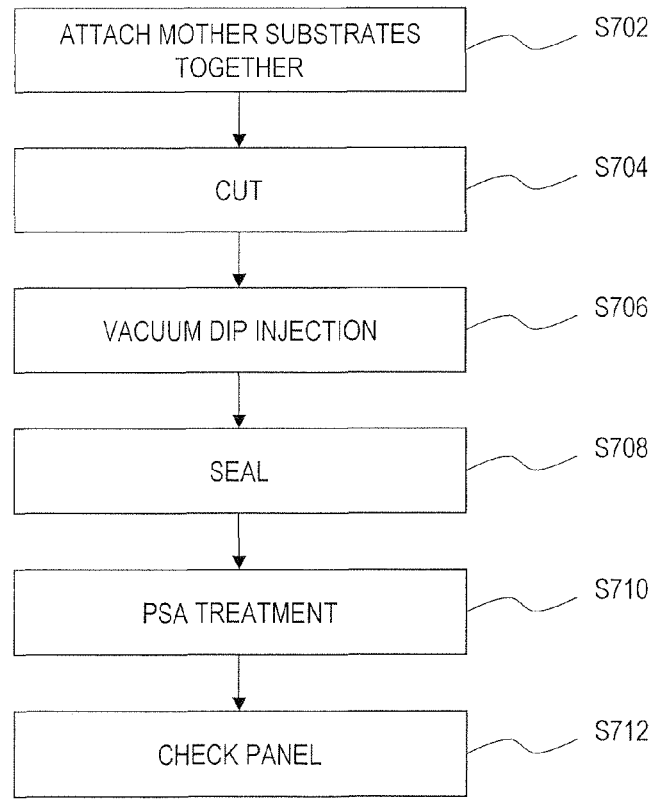
FIG. 7 Another flowchart showing production steps for the liquid crystal display device shown in FIG. 1.

Moreover, a plurality of liquid crystal panels 110 may be simultaneously formed by using large-sized mother substrates. Hereinafter, a method of producing the liquid crystal display device 100 will be described with reference to FIG. 7.

First, at S702, a mother substrate 220 and a mother substrate 230 are attached together. The mother substrate 220 includes a plurality of front substrates 120, such that the plurality of front substrates 120 are disposed in a matrix of plurality of rows and columns in the mother substrate 220. The mother substrate 220 is produced by forming a counter electrode 124 and an alignment film 126 on a transparent large-sized insulative substrate (e.g., glass substrate), such that the respective insulative substrates 122 of the plurality of front substrates 120 account for portions of the large-sized insulative substrate. In the following descriptions of the present specification, the mother substrate 220 may also be referred to as the first mother substrate 220.

Moreover, the mother substrate 230 includes a plurality of rear substrates 130, such that the plurality of rear substrates 130 are disposed in a matrix of plurality of rows and columns in the mother substrate 230. The mother substrate 230 is produced by forming pixel electrodes 134, wiring lines 135, an alignment film 136, check lines 172, check terminals 174, additional lines 182, and additional terminals 184 on a transparent large-sized insulative substrate (e.g., a glass substrate), such that the respective insulative substrates 132 of the plurality of rear substrates 130 account for portions of the large-sized insulative substrate. In the following descriptions of the present specification, the mother substrate 230 may also be referred to as the second mother substrate 230.

Through the attachment, the front substrate 120 of the first mother substrate 220 and the rear substrate 130 of the second mother substrate 230 are made to oppose each other. Note that the mixture 140c has not been introduced between the front substrate 120 and the rear substrate 130 at this point. In the following descriptions of the present specification, a construction in which the front substrate 120 and the rear substrate 130 oppose each other with no mixture 140c or liquid crystal layer 140 interposed therebetween will be referred to as a vacant panel. A plurality of vacant panels are produced through the attachment. Before attaching together the first and second mother substrates 220 and 230, a sealant is introduced on one of the front substrate 120 and the rear substrate 130 in a shape that is closed except in an injection inlet.

Next, at S704, the first mother substrate 220 and the second mother substrate 230 are cut apart, whereby a plurality of vacant panels are taken out.

Next, at S706, the mixture 140c containing a liquid crystal compound and a photopolymerizable compound is injected in between the front substrate 120 and the rear substrate 130 of the vacant panel. For example, after vacuuming the inside of the vacant panel in a vacuum, the injection inlet of the vacant panel is immersed in a dish in which the mixture 140c has been poured, thereby allowing the mixture 140c to be injected into the vacant panel; thus, the liquid crystal panel 110 is produced.

Next, at S708, the injection inlet of the liquid crystal panel 110 is sealed. A resin is applied on the injection inlet of the liquid crystal panel 110, and is irradiated with ultraviolet light or visible light, thereby curing the resin and sealing the injected portion.

Next, a PSA treatment is performed at S710. As mentioned earlier, the wiring lines 125 and 135 provided corresponding to the counter electrode 124 and the pixel electrodes 134 are electrically connected to the additional terminals 184 via the check lines 172, the check terminals 174, and the additional lines 182; and a voltage is applied to the mixture 140c from the additional terminals 184. By radiating ultraviolet light while aligning the liquid crystal molecules 142 with such voltage application, the alignment sustaining layers 150 and 160 are formed, and the alignment of the liquid crystal molecules 142 becomes stored.

Next, at S712, a check for pixel defects is performed with respect to each liquid crystal panel 110 by applying a voltage across the liquid crystal layer 140 from the check terminals 174. In this manner, the plurality of liquid crystal display devices 100 can be efficiently produced.

Embodiment 2

In the above description, the additional terminals are provided on the liquid crystal panel; however, the present invention is not limited thereto.

Figure 8:
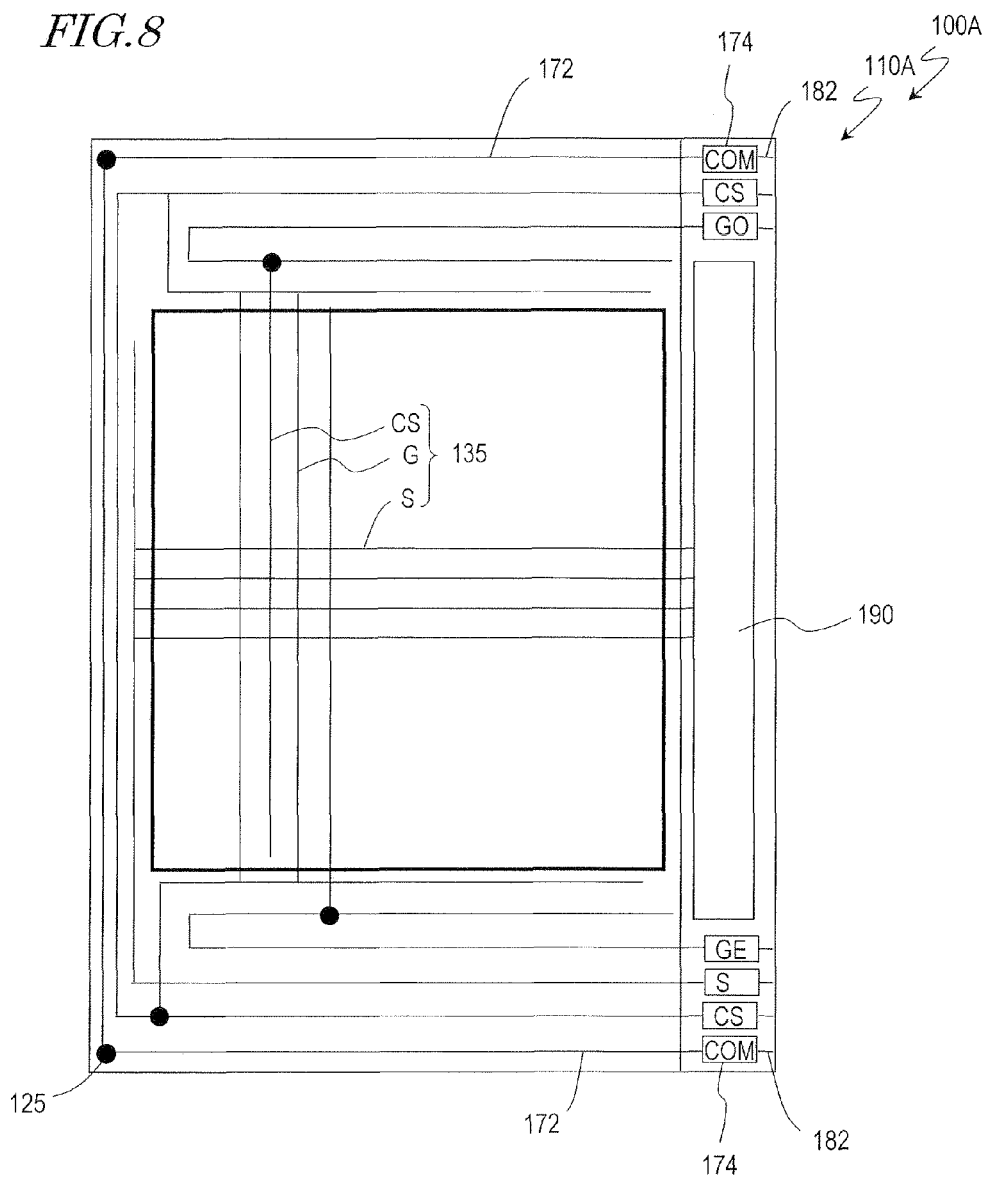
FIG. 8 A schematic plan view showing a second embodiment of the liquid crystal display device of the present invention.

Hereinafter, with reference to FIG. 8, a second embodiment of the liquid crystal display device of the present invention will be described. A liquid crystal display device 100A of the present embodiment is similar in construction to the above-described liquid crystal display device 100 except that the additional terminals 184 are not provided on a liquid crystal panel 110A; any overlapping description will be omitted in order to avoid redundancy.

In the liquid crystal panel 110A of the liquid crystal display device 100A, additional lines 182 extend on the rear substrate 130 toward an end thereof, from check terminals 174. As will be described later, the additional terminals 184 are provided on a mother substrate, and not on the liquid crystal panel 110A.

Hereinafter, with reference to FIG. 9 and FIG. 10, a method of producing the liquid crystal display device 100A will be described.

First, the mixture 140c is added dropwise to at least either one of front substrates 120 of a first mother substrate 220 and rear substrates 130 of a second mother substrate 230, and thereafter, at S902, the first mother substrate 220 and the second mother substrate 230 are attached together as shown in FIG. 10(a) and FIG. 10(b). For example, the size of the first mother substrate 220 is substantially equal to the size of the second mother substrate 230. Through the attachment, the front substrate 120 of the first mother substrate 220 and the rear substrate 130 of the second mother substrate 230 are made to oppose each other, whereby the liquid crystal panel 110A is produced.

Herein, the mother substrate 220 includes a plurality of front substrates 120, such that the plurality of front substrates 120 are disposed in a matrix of plurality of rows and columns in the mother substrate 220. The mixture 140c contains a liquid crystal compound and a photopolymerizable compound.

The mother substrate 230 includes a plurality of rear substrates 130, such that the plurality of rear substrates 130 are disposed in a matrix of plurality of rows and columns in the mother substrate 230. On the mother substrate 230, the additional terminals 184 are provided in regions other than the rear substrates 130. As described earlier, a voltage is applied from the additional terminals 184 during a PSA treatment. Herein, the additional terminals 184 are provided at both of right and left ends of the mother substrate 230, so as to correspond to a number of rear substrates 130 arranged along the row direction, such that the same voltage is applied to the additional terminals 184 at the right and left ends.

In the mother substrate 230, the additional lines 182 extend from the check terminals 174 to the additional terminals 184. The additional lines 182 include connection lines 182s and common lines 182t. Each common line 182t extends from an additional terminal 184 at one end to an additional terminal 184 at the other end. The connection lines 182s extend from the check terminals 174 of each rear substrate 130 to the outside of the rear substrate 130 and extend between adjoining rear substrates 130, so as to connect to the common lines 182t. The common lines 182t are used in common for the number of rear substrates 130 arranged along the row direction.

The additional lines 182 are formed from the material composing the gate layer or the source layer, e.g., Al, Ti, or Mo. In the case where the connection lines 182s extending from the check terminals 174 straddle the common lines 182t, the organic insulative film and/or inorganic insulative film that is used for the TFTs may also be deposited on the common lines 182t, upon which bridge structures may be formed by using the electrically conductive material that is used for the pixel electrodes 134. Thus, as necessary, the additional lines 182 may be formed by using the materials of the gate layer, the source layer, or the pixel electrodes 134 (ITO, IZO, etc.).

Moreover, granted that the voltage applied across the liquid crystal layer 140 is not decreased due to signal deterioration, the width of the additional lines 182 may be as small as possible. It has been confirmed that, in the case where the common lines 182t have a length of 650 mm, hardly any signal deterioration occurs when the common lines 182t have a width of 80 μm and the connection lines 182s have a width of 10 µm, for example. The widths of the wiring lines may even be shorter so long as signal deterioration does not occur. Moreover, bridge structures may be provided for allowing a PSA treatment to be performed even when any wiring line becomes disrupted.

Moreover, the additional terminals 184 may be formed from Al, Ti, Mo, or the like used for the gate layer or the source layer, or ITO or IZO used for forming the pixel electrodes 134, simultaneously with the gate layer, the source layer, or the pixel electrodes 134. Misalignments between the substrates and a jig can be suppressed when the additional terminals 184 are sized 1200 µm×1800 µm to 1800 µm×1800 µm. Depending on the jig alignment method and the shape and size of the probe tip, the additional terminals 184 may have even smaller sizes.

On the liquid crystal panel 110A, the additional terminals 184 are provided in regions other than the rear substrate 130, whereby the frame region of the liquid crystal panel 110A can be narrowed. Since the additional lines 182 include the connection lines 182s and the common lines 182t, even if one connection line 182s becomes disrupted, a PSA treatment can be performed for the liquid crystal panel 110A corresponding to another connection line 182s. Moreover, additional terminals 184 to which the same voltage is applied are provided at both of right and left ends of the second mother substrate 230, the two additional terminals 184 being connected by a common line 182t. Therefore, even if a line break occurs in a portion of the common line 182t such that the electrical connection between one of the additional terminals 184 and the connection line 182s is lost, the electrical connection between the other additional terminal 184 and the connection line 182s is maintained, so that a PSA treatment can surely be performed.

Next, at S904, as shown in FIG. 10(c), both end portions of the first mother substrate 220 where it overlaps the additional terminals 184 are removed to expose the additional terminals 184.

Next, at S906, a voltage is applied to the mixture 140c of each liquid crystal panel 110A from the additional terminals 184.

The voltage applications is performed by supplying a signal from a signal generator to the liquid crystal panel 110A while keeping a probe in contact the additional terminals 184 by using a specialized jig. During the PSA treatment, a voltage is input at the additional terminals 184. By thus radiating ultraviolet light with such voltage application, the photopolymerizable compound in the mixture 140c becomes polymerized to form the alignment sustaining layers 150 and 160, and the liquid crystal layer 140 is formed. Note that the light source (not shown) may have an effective irradiation area which is about equal to or greater than the size of the liquid crystal panel 110A. For example, in the case where a PSA treatment is to be performed for the mother substrates 220 and 230, light may be radiated as many times as there are liquid crystal panels 110A formed in the mother substrates 220 and 230, whereby the PSA treatment can be performed. From the standpoint of mass production, it is preferable that the effective irradiation area of the light source is similar in size to the mother substrates 220 and 230.

Next, at S908, the first mother substrate 220 and the second mother substrate 230 are cut apart, whereby a plurality of liquid crystal panels 110A are taken out. Through this cutting, most of the additional lines 182 and the additional terminals 184 are isolated from the liquid crystal panel 110A.

Next, at S910, a check for pixel defects is performed by applying a voltage across the liquid crystal layer 140 at the check terminals 174 of each liquid crystal panel 110A. In this manner, the liquid crystal display device 100A can be produced.

Hereinafter, advantages of the liquid crystal display device 100A of the present embodiment will be described in comparison with a liquid crystal display device of Comparative Example 2. The liquid crystal display device of Comparative Example 2 is described with reference to FIG. 11. The liquid crystal display device 500A of Comparative Example 2 has a similar construction to that of the above-described liquid crystal display device 100A, except that additional lines 582 extend from check lines 572 in the liquid crystal panel 510A. The liquid crystal display device 500A of Comparative Example 2 is also produced as described with reference to FIG. 9 and FIG. 10.

In the rear substrate of the liquid crystal display device 500A, the additional lines 582 extend outside of the check lines 572. Therefore, the frame region of the liquid crystal panel 510A is enlarged, thus making it impossible to realize a small-sized liquid crystal panel 510A. On the other hand, in the liquid crystal panel 110A, as shown in FIG. 8, the additional lines 182 extend from the check terminals 174 essentially in parallel to the check lines 172. As a result, the frame region of the liquid crystal panel 110A can be narrowed, and a small-sized liquid crystal panel 110A can be realized.

FIG. 12(a) shows mother substrates 620 and 630 which have been attached together in a production process for the liquid crystal display device 500A of Comparative Example 2. Since the frame region of the liquid crystal panel 510A in the liquid crystal display device 500A of Comparative Example 2 is relatively broad, the number of liquid crystal panels 510A that can be taken out from the mother substrates 620 and 630 is relatively small.

FIG. 12(b) shows the mother substrates 220 and 230 having been attached together in the production process for the liquid crystal display device 100A of the present embodiment. Since the frame region of the liquid crystal panel 110A in the liquid crystal display device 100A is relatively narrow, there is no need to change the distance between adjoining liquid crystal panels 110A, and even in the case where a PSA treatment is to be performed for the liquid crystal panel 110A, a relatively large number of liquid crystal panels 110A can be taken out from the mother substrates 220 and 230.

Note that the check lines 172 and the additional lines 182 may be utilized as portions of the wiring lines for forming a short ring (not shown). In the mother substrates 220 and 230 having been attached together, the wiring lines 125 and 135 are electrically short-circuited via the check lines 172, the check terminals 174, the additional lines 182, the additional terminals 184, and short-circuiting wiring lines (not shown), thereby forming a short ring. The wiring lines 125 and 135 being thus short-circuited suppress electrostatic breakdowns. Note that, at the time of exposing the additional terminals 184 as shown in S904, the short-circuiting wiring lines may be cut to electrically isolate the additional terminals 184 from one another, thus eliminating the short ring.

Figure 9:
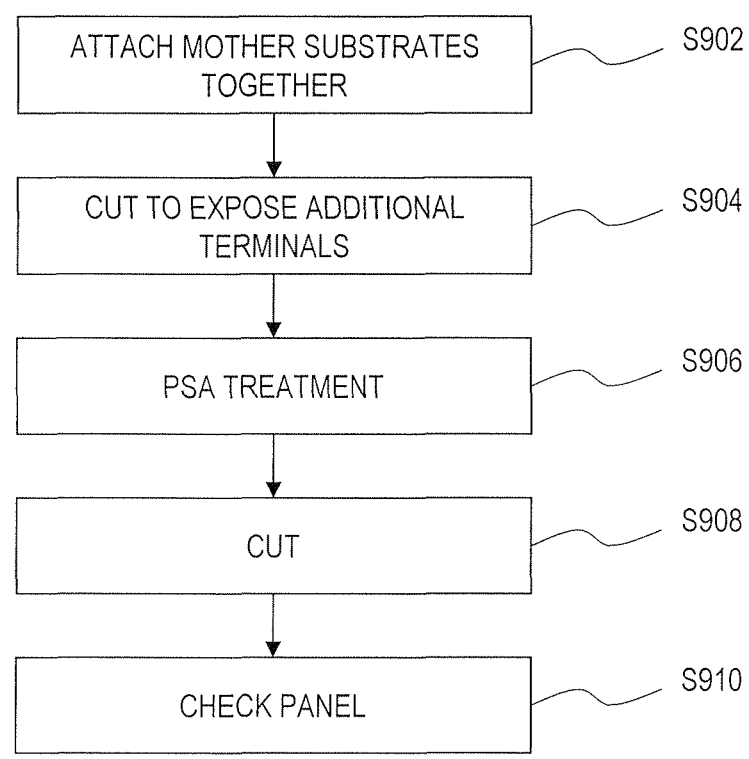
FIG. 9 A flowchart showing production steps for the liquid crystal display device shown in FIG. 8.
Figure 10:
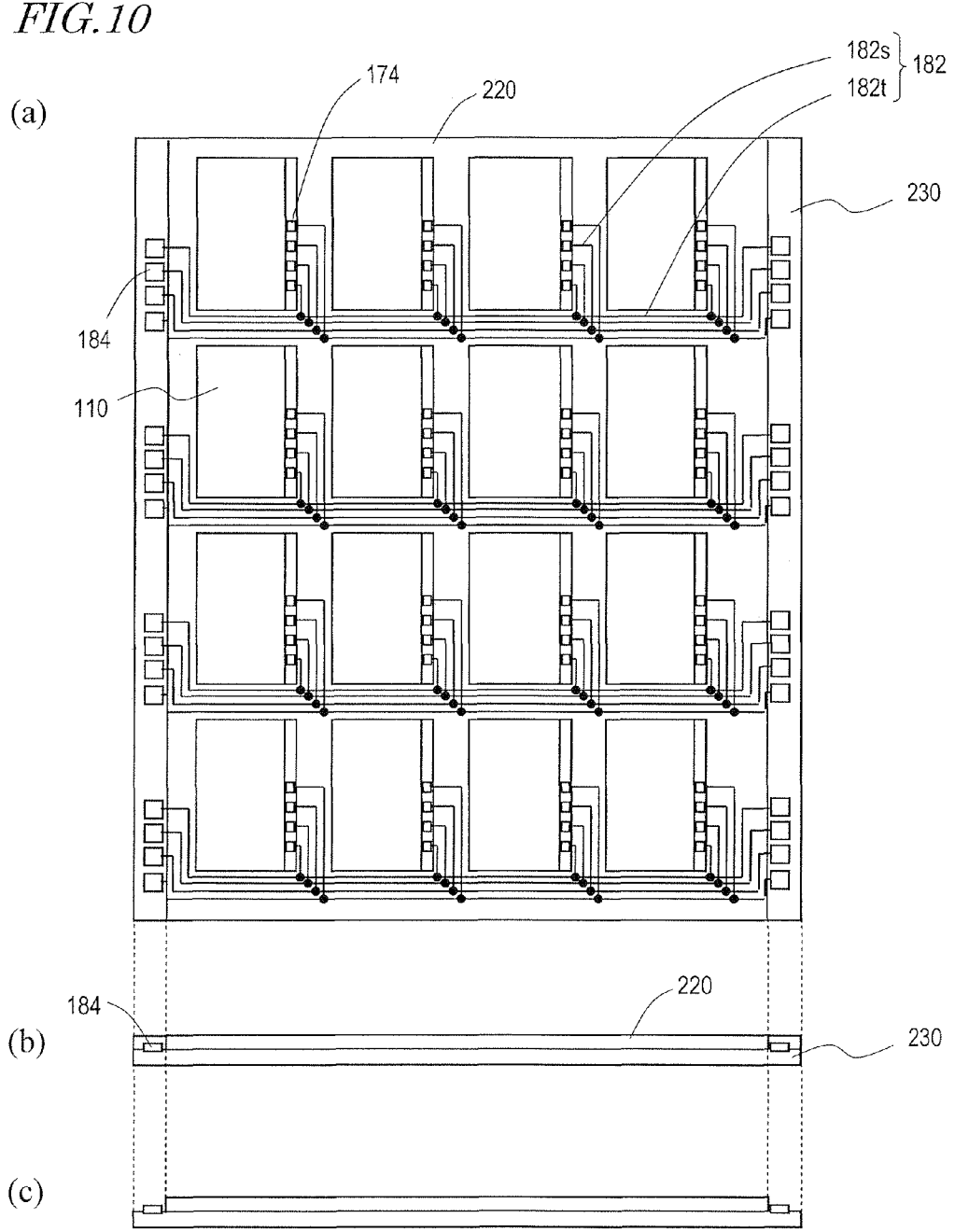
FIG. 10 (a) is a schematic plan view showing mother substrates which have been attached together in a production process for the liquid crystal display device shown in FIG. 8; and (b) and (c) are schematic cross-sectional views.
Figure 11:
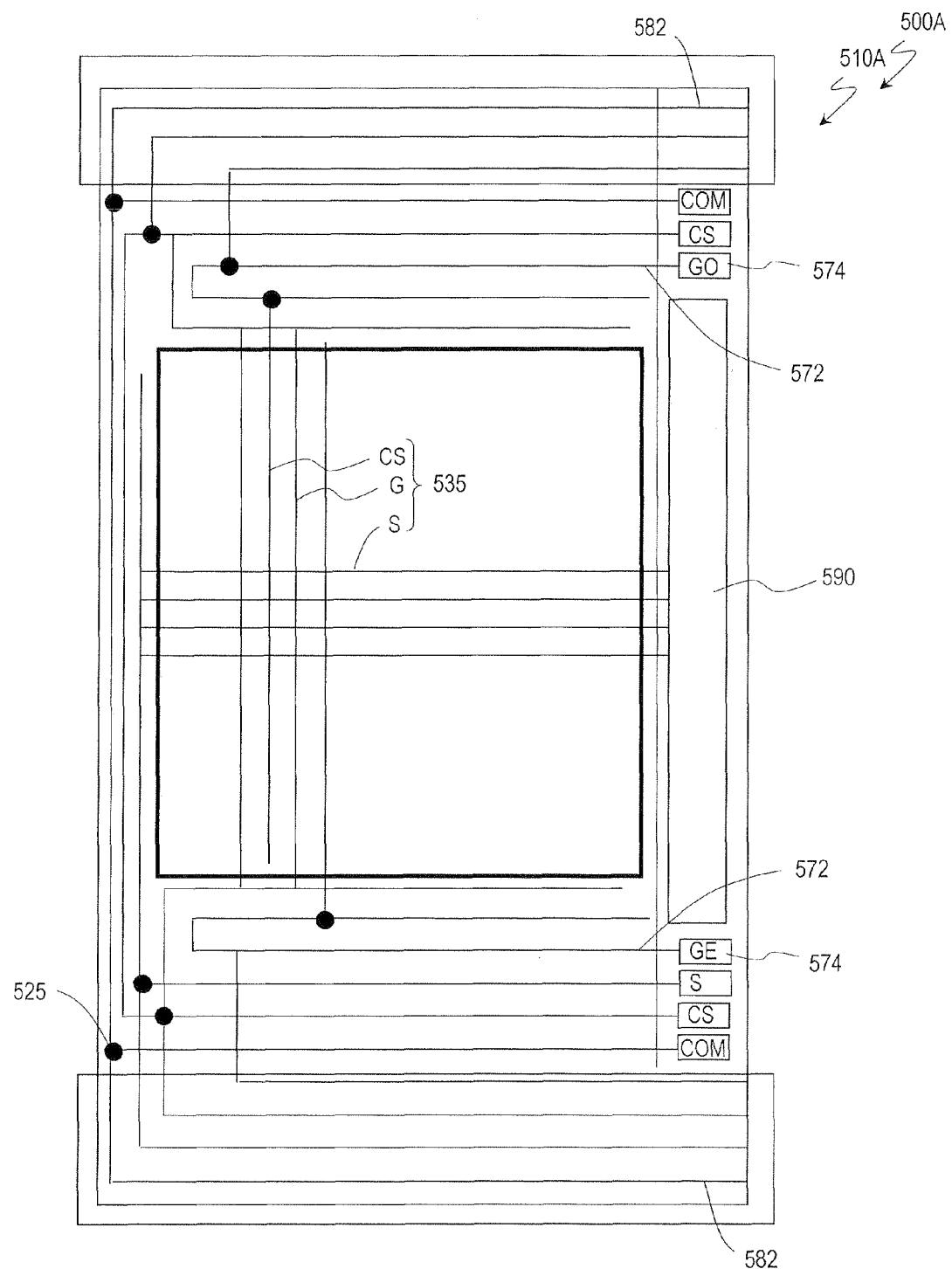
FIG. 11 A schematic diagram showing a liquid crystal display device of Comparative Example 2.

Although a dropwise injection of the mixture 140c is performed in the description referring to FIG. 9 and FIG. 10, the present invention is not limited thereto.

Figure 13:
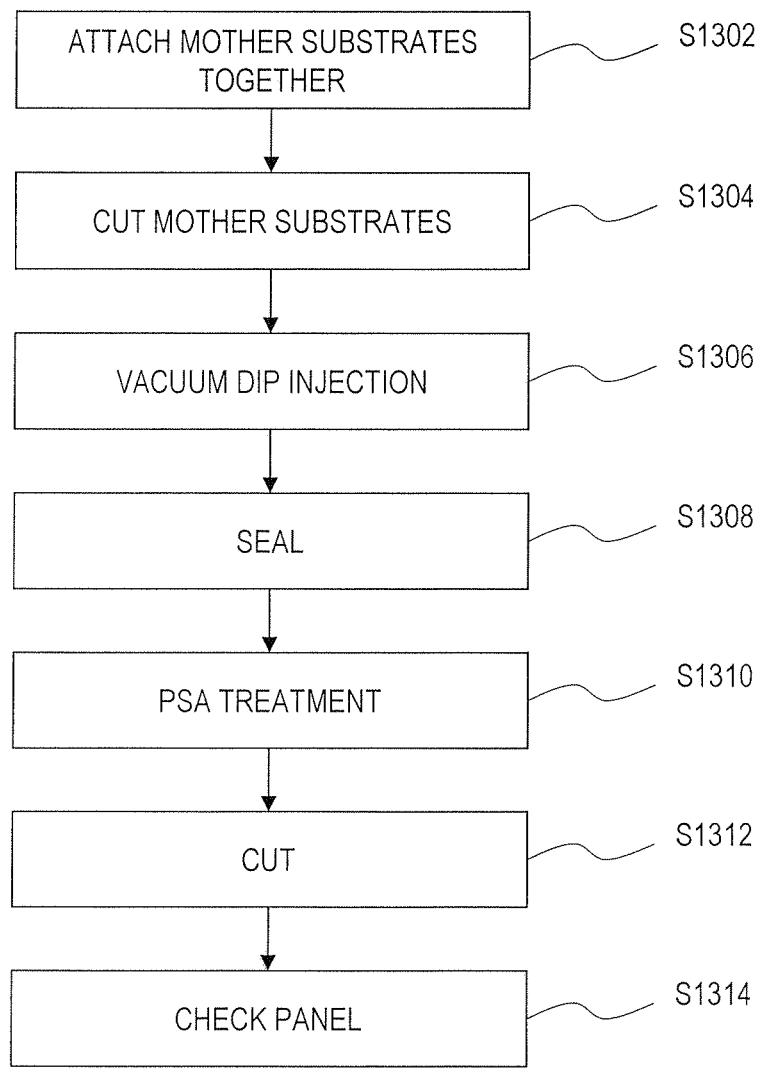
FIG. 13 Another flowchart showing production steps for the liquid crystal display device shown in FIG. 8.
Figure 14:
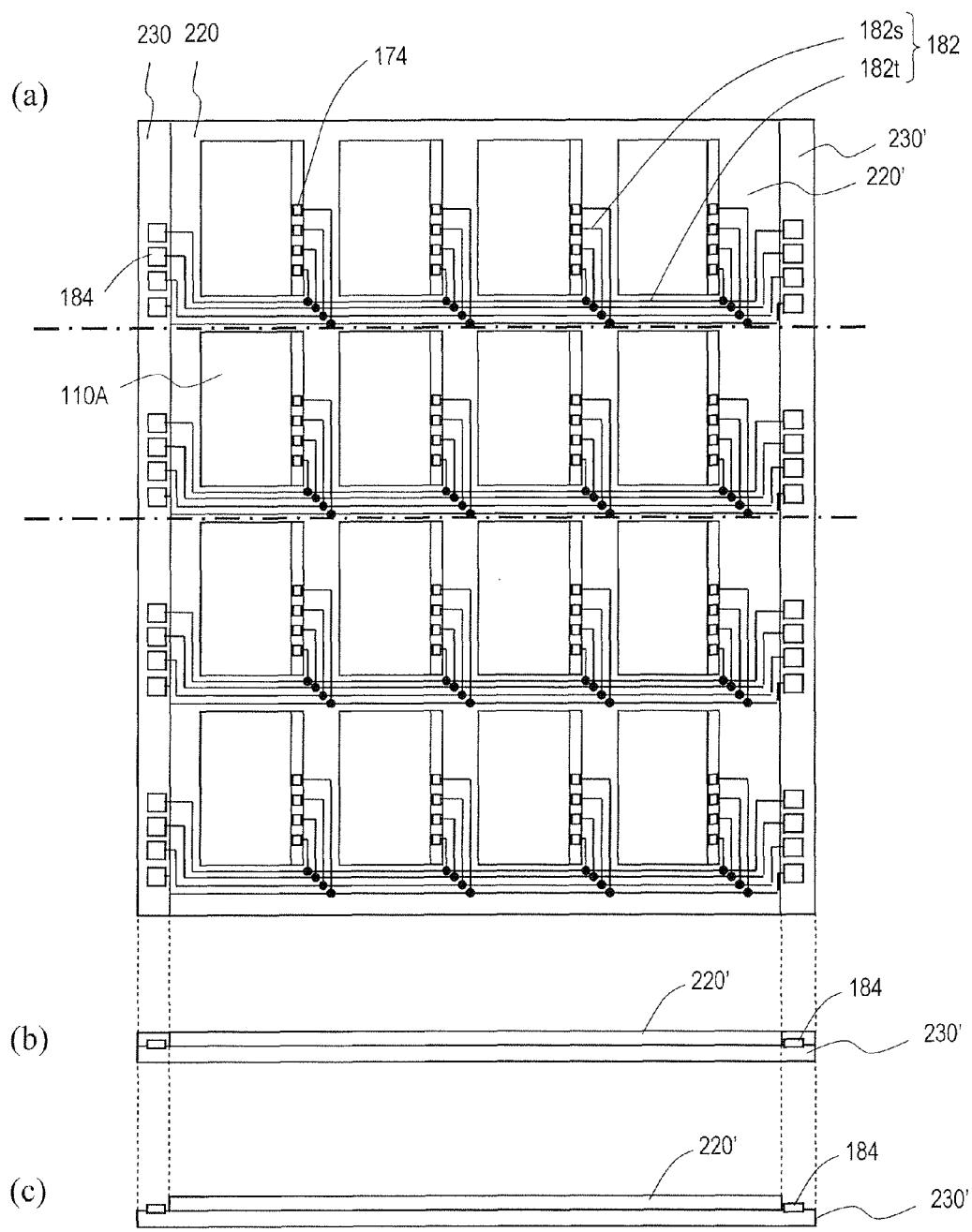
FIG. 14 (a) is a schematic plan view showing mother substrates which have been attached together in a production process for the liquid crystal display device shown in FIG. 8; and (b) and (c) are schematic cross-sectional views.

Hereinafter, another method of producing the liquid crystal display device 100A according to the present invention will be described with reference to FIG. 13 and FIG. 14.

First, at S1302, as shown in FIG. 14(a) and FIG. 14(b), a mother substrate 220 including a plurality of front substrates 120 and a mother substrate 230 including a plurality of rear substrates 130 are attached together. Through this attachment, a plurality of vacant panels are produced in each of which the front substrate 120 and the rear substrate 130 oppose each other via a predetermined interspace.

Additional terminals 184 are provided at both of right and left ends of the mother substrate 230. In the mother substrate 230, the additional lines 182 extend from the check terminals 174 to the additional terminals 184. The additional lines 182 include connection lines 182s and common lines 182t. Each common line 182t extends from additional terminal 184 at one end to an additional terminal 184 at the other end. The connection lines 182s extend from the check terminals 174 of each rear substrate 130 to the outside of the rear substrate 130 and extend between adjoining rear substrates 130, so as to connected to the common lines 182t. The common lines 182t are used in common for the number of rear substrates 130 arranged along the row direction.

Thus, most of the additional lines 182 and the additional terminals 184 are provided in regions other than the rear substrate 130, whereby the frame region of the liquid crystal panel 110A can be narrowed. Since the additional lines 182 include the connection lines 182s and the common lines 182t, even if one connection line 182s becomes disrupted, a PSA treatment can be performed for the liquid crystal panel 110A corresponding to another connection line 182s. Moreover, additional terminals 184 to which the same voltage is applied are provided at both of right and left ends of the second mother substrate 230, the two additional terminals 184 being connected by a common line 182t. Therefore, even if a line break occurs in a portion of the common line 182t such that the electrical connection between a connection line 182s and one additional terminal 184 is lost, the electrical connection between the connection line 182s and the other additional terminal 184 is maintained, so that a PSA treatment can surely be performed.

Next, at S1304, the mother substrates 220 and 230 having been attached together are cut apart. Through this cutting, mother substrates 220' and 230' including a plurality of vacant panels are taken out. Moreover, as shown in FIG. 14(c), ends of the cut mother substrate 220' are removed during the cut, thus leaving the additional terminals 184 revealed. In the following descriptions, the substrates 220' and 230' having been cut apart may be referred to as cut mother substrates. In FIG. 14(a), cut lines when cutting the mother substrates 220 and 230 into the cut mother substrates 220' and 230' are indicated by dot-dash lines.

Next, at S1306, a mixture 140c containing a liquid crystal compound and a photopolymerizable compound is injected in between the front substrates 120 and the rear substrates 130 of the vacant panels in a vacuum. The cut mother substrates 220' and 230' are set in a chamber and an essential vacuum is created in their surroundings to vacuum the inside of the vacant panels. Thereafter, injection inlets of the vacant panels are immersed in a dish in which the mixture 140c has been poured, thereby allowing the mixture 140c to be injected into the vacant panels. Thus, the liquid crystal panels 110A are produced.

Next, at S1308, the injection inlets of the liquid crystal panels 110A are sealed. A resin is applied on the injection inlets of the liquid crystal panels 110A, and is irradiated with ultraviolet light or visible light, thereby curing the resin and sealing the injected portions.

Next, at S1310, a PSA treatment is performed. As described above, the wiring lines 125 and 135 provided corresponding to the counter electrode 124 and the pixel electrodes 134 are electrically connected to the additional terminals 184 via the check lines 172, the check terminals 174, and the additional lines 182; therefore, with voltage application at the additional terminals 184, a voltage is applied to the mixture 140c in the liquid crystal panels 110A. In the PSA treatment, after applying a voltage at the additional terminals 184 to align the liquid crystal molecules 142, ultraviolet light is radiated. As a result of this, the alignment sustaining layers 150 and 160 are formed, and the alignment of the liquid crystal molecules 142 becomes stored.

Next, at S1312, the cut mother substrates 220' and 230' are further cut apart, whereby the liquid crystal panels 110A are taken out. Through this cutting, most of the additional lines 182 and the additional terminals 184 are isolated from the liquid crystal panels 110A.

Next, at S1314, a defect check is performed for each liquid crystal panel 110A. In the defect check, the liquid crystal panel is powered to check whether the pixels appear lit or not.

Again, the check lines 172 and the additional lines 182 may be utilized as portions of the wiring lines for forming a short ring (not shown). In the mother substrates 220 and 230 having been attached together, the wiring lines 125 and 135 are electrically short-circuited via the check lines 172, the check terminals 174, the additional lines 182, the additional terminals 184, and short-circuiting wiring lines (not shown), thereby forming a short ring. The wiring lines 125 and 135 being thus short-circuited suppress electrostatic breakdowns. Note that, at the time of taking out the cut mother substrates 220' and 230' as shown in S1304, the short-circuiting wiring lines may be cut to electrically isolate the additional terminals 184 from one another, thus eliminating the short ring.

In the above description, the additional terminals 184 are provided at both ends of the second mother substrate 230; however, the present invention is not limited thereto. The additional terminals 184 may be provided between adjoining rear substrates 130 that are provided in the second mother substrate 230.

Moreover, a switching element(s) (not shown) may be provided between the gate lines G and source lines S in the liquid crystal panel 110A and the terminals P-G and terminals P-S. During a PSA treatment, a voltage is applied to the gate(s) of the switching element(s) to allow the gate lines G and source lines S to be electrically connected to the terminals P-G and terminals P-S. At any time other than during the PSA treatment, the gate lines G and source lines S are kept insulated from the terminals P-G and terminals P-S by the switching element(s). As a result, influences of static electricity on the gate lines G and source lines S can be reduced.

Figure 15:
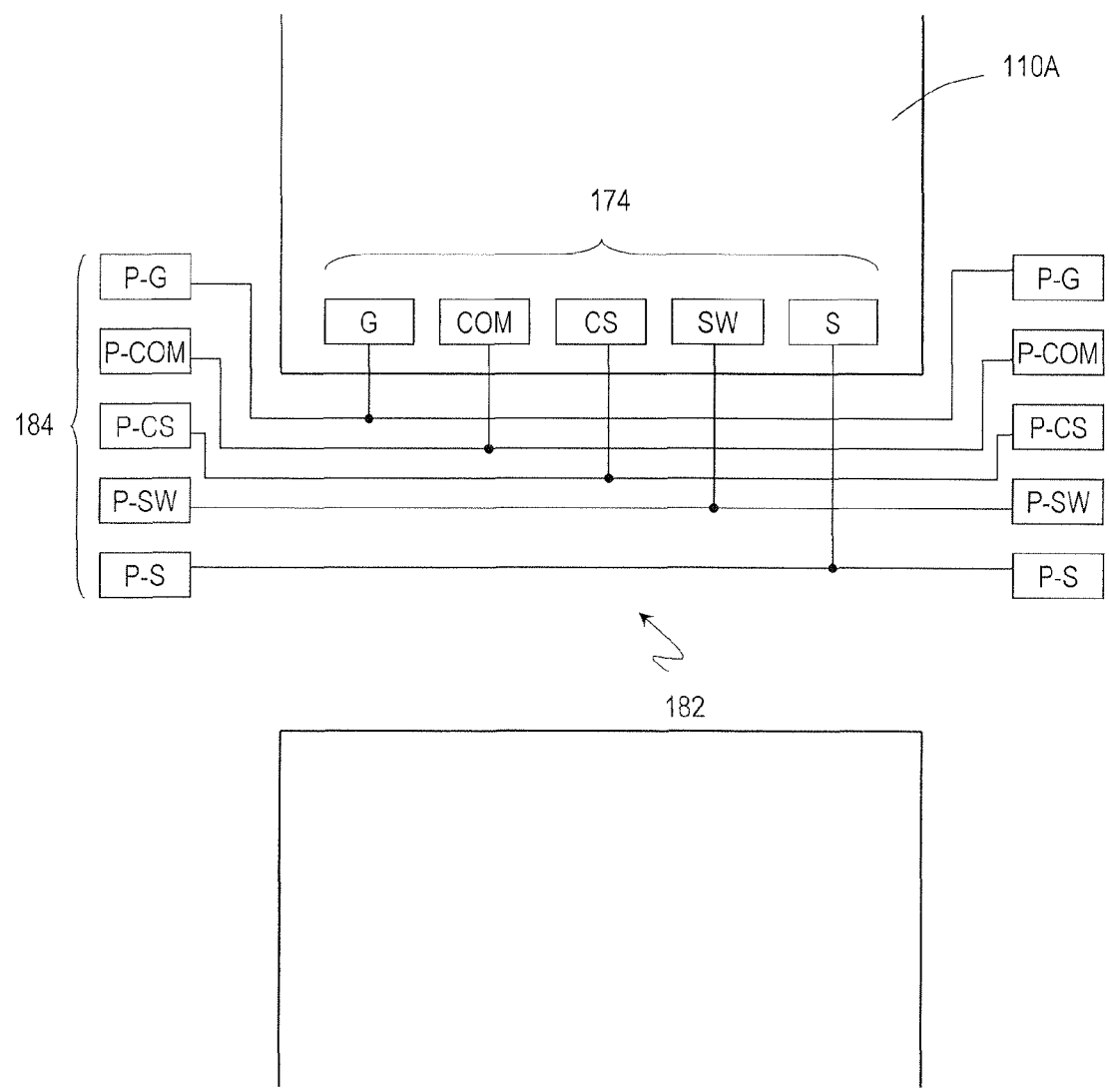
FIG. 15 Another schematic diagram showing mother substrates which have been attached together in a production process for the liquid crystal display device shown in FIG. 8.

FIG. 15 shows mother substrates 220 and 230 on which additional lines 182 and additional terminals 184 are provided between adjoining liquid crystal panels 110A. Herein, specifically, the additional terminals 184 include terminals P-G to which a voltage for the gate lines G is applied, terminals P-COM to which a voltage for the counter electrode 124 is applied, terminals P-CS to which a voltage for the storage capacitor lines CS is applied, terminals P-SW to which a voltage corresponding to a switch signal is applied, and terminals P-S to which a voltage for the source lines S is applied. Herein, although not shown, the terminals P-SW are electrically connected to the gates of switching elements which are provided between the gate lines G and source lines S in the liquid crystal panel 110A and the terminals P-G and terminals P-S.

Since the additional terminals 184 are provided between adjoining liquid crystal panels 110A, the additional lines 182 extend over shorter distances from the check terminals 174 to the additional terminals 184, whereby line breaks become less likely, and failures due to a voltage not being applied during the PSA treatment can be suppressed. The widths and materials of the additional lines 182 may be similar to those mentioned above, and the sizes and materials of the additional terminals 184 may be similar to those mentioned above.

Although the above description illustrates the additional terminals 184 being provided on the mother substrate 230, the present invention is not limited thereto. Instead of the additional terminals 184, a circuit for the PSA treatment may be provided monolithically on the mother substrate 230.

Embodiment 3

The above description illustrates that additional lines and additional terminals are provided on at least one of the liquid crystal panel and the mother substrates; however, the present invention is not limited thereto. Additional terminals may be provided on neither the liquid crystal panel nor the mother substrates.

Figure 16:
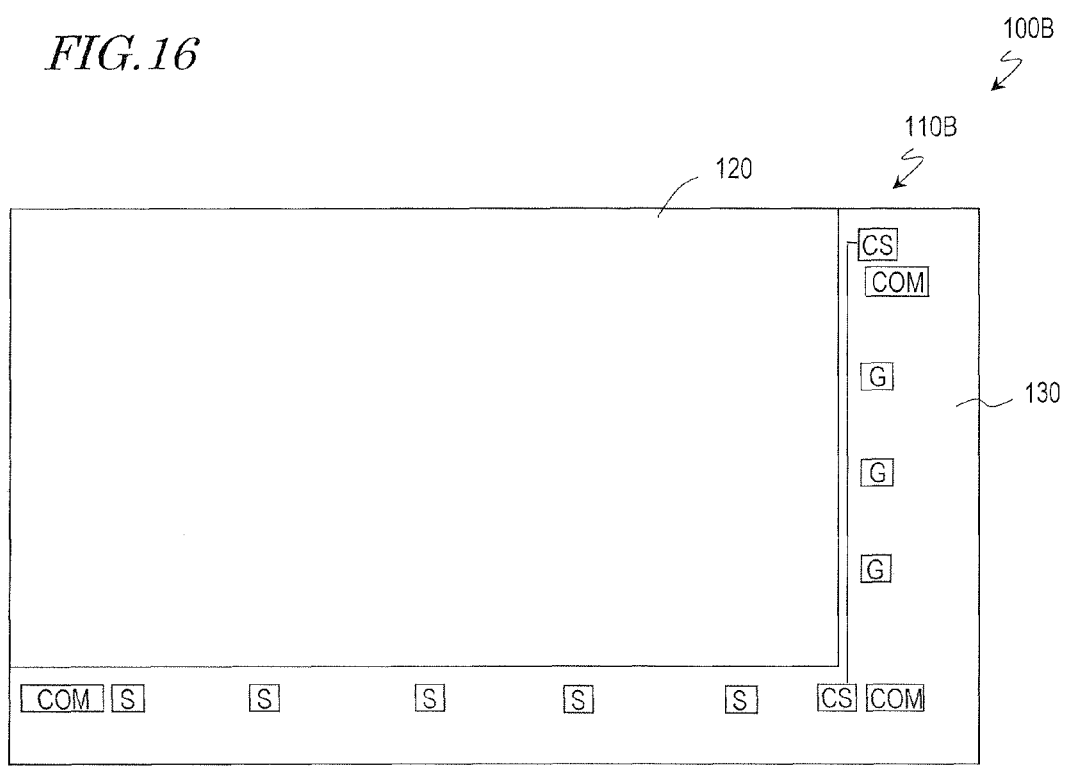
FIG. 16 A schematic plan view showing a third embodiment of the liquid crystal display device of the present invention.

FIG. 16 shows a schematic diagram of a third embodiment of the liquid crystal display device of the present invention. The liquid crystal display device 100B of the present embodiment is similar in construction to the liquid crystal display device 100 described above with respect to Embodiment 1, except that no additional terminals and no additional lines are provided; any overlapping description will be omitted in order to avoid redundancy. In the liquid crystal display device 100B, a voltage is applied at the check terminals 174 not only during a defect check but also during a PSA treatment. Note that voltage application during the PSA treatment may be performed by using a probe similar to that used in the defect check, or a probe which results from permitting electrical connection in portions of the wiring lines of a probe that is used in the defect check.

Figure 17:
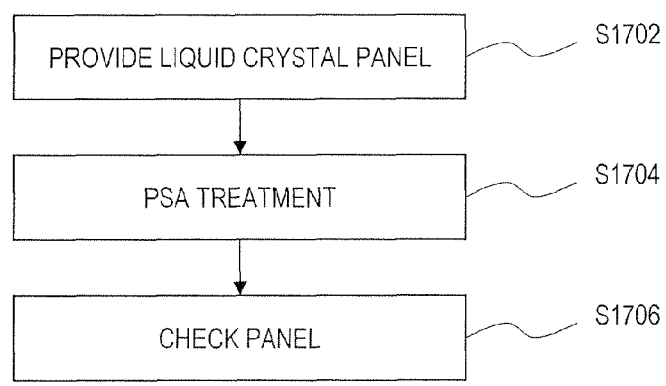
FIG. 17 A flowchart showing production steps for the liquid crystal display device shown in FIG. 16.

A method of producing the liquid crystal display device 100B will be described with reference to FIG. 17. In order to avoid unnecessary complexity of descriptions, a method of producing one liquid crystal display device 100B will be described herein.

First, at S1702, a liquid crystal panel 110B is provided. Herein, the liquid crystal panel 110B includes: a front substrate 120; a rear substrate 130 opposing the front substrate 120; pixel electrodes 134; gate lines G, source lines S, and storage capacitor lines CS provided corresponding to the pixel electrodes 134; a mixture 140c interposed between the front substrate 120 and the rear substrate 130; and check terminals 174. The mixture 140c contains a liquid crystal compound and a photopolymerizable compound.

In order to introduce the mixture 140c in between the front substrate 120 and the rear substrate 130, dropwise injection of the mixture 140c may be performed, or dip injection of the mixture 140c may be performed.

Next, at S1704, ultraviolet light is radiated while applying voltages to the mixture 140c via the check terminals 174. As a result, the photopolymerizable compound in the mixture 140c becomes polymerized to form the alignment sustaining layers 150 and 160, and also the liquid crystal layer 140 containing the liquid crystal compound is formed. The voltage application is performed while keeping a probe of a signal generator in contact the check terminals 174, for example.

Next, at S1706, a check for pixel defects is performed by applying a voltage across the liquid crystal layer 140 at the check terminals 174. Thereafter, as necessary, a backlight, a driver, and the like may be attached to the liquid crystal panel 110B. In this manner, the liquid crystal display device 100B can be produced.

Figure 18:
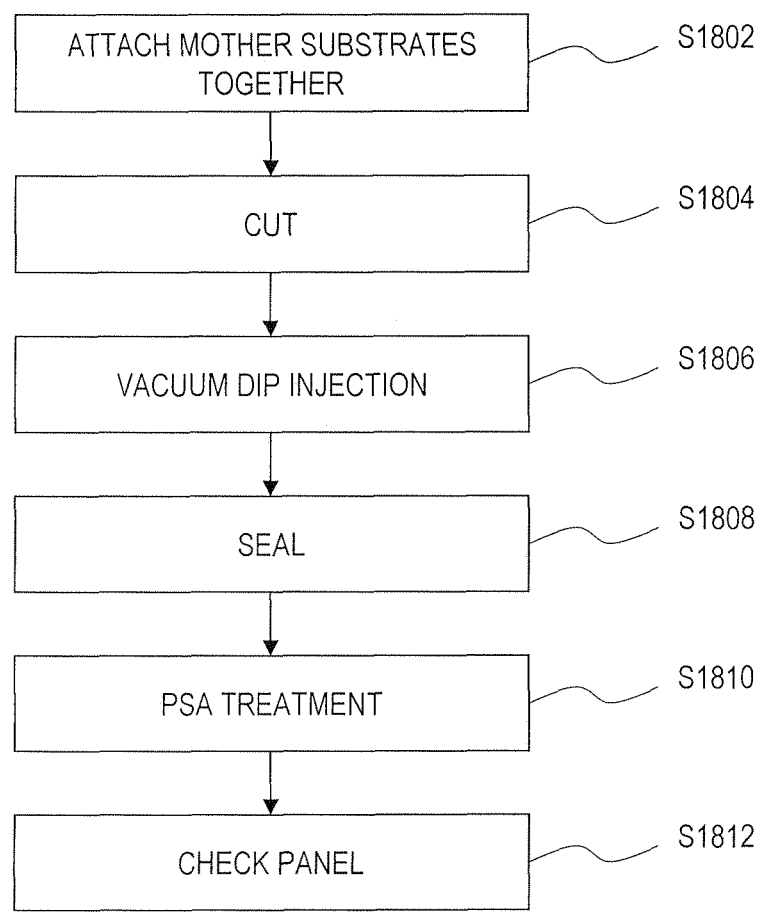
FIG. 18 Another flowchart showing production steps for the liquid crystal display device shown in FIG. 16.

Moreover, a plurality of liquid crystal panels 110B may be simultaneously formed by using large-sized mother substrates. Hereinafter, a method of producing the liquid crystal display device 100B will be described with reference to FIG. 18.

First, at S1802, a mother substrate 220 including a plurality of front substrates 120 and a mother substrate 230 including a plurality of rear substrates 130 are attached together. Through this attachment, the front substrate 120 and the rear substrate 130 of each liquid crystal panel 110B are made to oppose each other; thus, a plurality of vacant panels are produced.

Next, at S1804, the mother substrates 220 and 230 having been attached together are cut apart, whereby vacant panels are taken out.

Next, at S1806, a mixture 140c containing a liquid crystal compound and a photopolymerizable compound is injected in between the front substrate 120 and the rear substrate 130 of the vacant panel in a vacuum. As a result, the liquid crystal panel 110B is produced. The cut mother substrates 220' and 230' are set in a chamber and an essential vacuum is created in their surroundings to vacuum the inside of the vacant panel. Thereafter, an injection inlet of the vacant panel is immersed in a dish in which the mixture 140c has been poured, thereby allowing the mixture 140c to be injected into the vacant panel.

Next, at S1808, the injection inlet of the liquid crystal panel 110B is sealed. A resin is applied on the injection inlet of the liquid crystal panel 110B, and is irradiated with ultraviolet light or visible light, thereby curing the resin and sealing the injected portion.

Next, a PSA treatment is performed at S1810. As mentioned earlier, the source lines S, the gate lines G, and the storage capacitor lines CS corresponding to the pixel electrodes 134 of the liquid crystal panel 110B are electrically connected to the check terminals 174 via the check lines 172; therefore, with voltage application at the check terminals 174, a voltage is applied to the mixture 140c in the liquid crystal panel 110B. Thus, in the PSA treatment, after applying a voltage across the liquid crystal layer 140 between the counter electrode 124 and the pixel electrodes 134 from the check terminals 174 to align the liquid crystal molecules 142, ultraviolet light is radiated. As a result, the alignment sustaining layers 150 and 160 are formed, and the alignment of the liquid crystal molecules 142 becomes stored.

Next, at S1812, a check for the liquid crystal panel 110B is performed. In the check, the liquid crystal panel 110B is powered, and a defect check for the pixels is performed.

Although the above description illustrates liquid crystal panels which are normally black, the present invention is not limited thereto. The liquid crystal panels may be normally white.

Although the above description illustrates liquid crystal panels having pixel electrodes of a fishbone structure, the present invention is not limited thereto. The liquid crystal panels may be of an MVA mode where the alignment directions of liquid crystal molecules are regulated by ribs and/or slits, or a CPA mode. Alternatively, the liquid crystal panels may have alignment films which have been subjected to a photo-alignment treatment.

Although the above description illustrates liquid crystal panels of a VA mode, the present invention is not limited thereto. The lliquid crystal panels may be of a TN mode, or of a lateral electric field type, e.g., an IPS mode or an FFS (Fringe Field Switching) mode. In the case of lateral electric field types, a common electrode may be provided on the rear substrate 130, instead of the counter electrode 124 provided on the front substrate 120.

INDUSTRIAL APPLICABILITY

According to the present invention, a liquid crystal display device which provides an improved response speed and which facilitates narrowing of the frame region can be produced. Moreover, according to the present invention, it is possible to make an effective use of mother substrates.

REFERENCE SIGNS LIST

- 100 liquid crystal display device
- 110 liquid crystal panel
- 120 front substrate
- 122 insulative substrate
- 124 counter electrode
- 125 wiring line
- 126 alignment film
- 130 rear substrate
- 132 insulative substrate
- 135 wiring line
- 136 alignment film
- 140 liquid crystal layer
- 142 liquid crystal molecules
- 150 alignment sustaining layer
- 160 alignment sustaining layer
- 172 check line
- 174 check terminal
- 182 additional line
- 182s connection line
- 182t common line
- 184 additional terminal

The invention claimed is:

1. A method of producing a liquid crystal display device, comprising:
   a step of providing at least one liquid crystal panel, the at least one liquid crystal panel having a front substrate, a rear substrate, a mixture interposed between the front substrate and the rear substrate, a plurality of electrodes including a pixel electrode which is provided on the rear substrate, a gate line and a source line provided corresponding to the pixel electrode, and a check terminal electrically connected to the gate line and the source line via a check line, the mixture containing a liquid crystal compound and a photopolymerizable compound;
   a step of forming from the mixture a liquid crystal layer containing the liquid crystal compound and an alignment sustaining layer resulting through polymerization of the photopolymerizable compound by performing light irradiation while applying a voltage to the mixture via the check terminal and the check line;
   a step of, after forming the liquid crystal layer and the alignment sustaining layer, applying a voltage across the liquid crystal layer from the check terminal to check the liquid crystal panel;
   wherein,
   the step of providing the at least one liquid crystal panel comprises a step of producing a plurality of liquid crystal panels,
   the step of producing the plurality of liquid crystal panels including:
   a step of providing a first mother substrate which includes the respective front substrates of the plurality of liquid crystal panels;
   a step of providing a second mother substrate which includes the respective rear substrates of the plurality of liquid crystal panels, the second mother substrate further including an additional terminal provided in a region other than the respective rear substrates of the plurality of liquid crystal panels and an additional line extending from the check terminal of the rear substrate corresponding to at least one liquid crystal panel among the plurality of liquid crystal panels to the additional terminal;
   wherein the additional terminal is provided at each of both ends in the row direction of the second mother substrate so as to correspond to rear substrates arranged along the row direction, and the additional line includes common line extending from the additional terminal at one of the both ends to the additional terminal at the other of the both ends;
   a step of attaching together the first mother substrate and the second mother substrate; and
   in the step of forming the liquid crystal layer and the alignment sustaining layer, the voltage is applied from the additional terminal.

2. The method of producing a liquid crystal display device of claim 1, wherein, in the step of providing the second mother substrate, the additional terminal is electrically connected to the check terminals of the rear substrates of a number of liquid crystal panels among the plurality of liquid crystal panels.

3. The method of producing a liquid crystal display device of claim 1, further comprising, before forming the liquid crystal layer and the alignment sustaining layer and after attaching together the first mother substrate and the second mother substrate, a step of removing a portion of the first mother substrate to leave the additional terminal of the second mother substrate exposed.

4. The method of producing a liquid crystal display device of claim 1, wherein, the step of producing the plurality of liquid crystal panels comprises, before attaching together the first mother substrate and the second mother substrate, a step of adding the mixture dropwise to at least one of the front substrate and the rear substrate of each of the plurality of liquid crystal panels.

5. The method of producing a liquid crystal display device of claim 4, further comprising, after forming the liquid crystal layer and the alignment sustaining layer and before checking the liquid crystal panel, a step of cutting the first mother substrate and the second mother substrate to take out the plurality of liquid crystal panels.

6. The method of producing a liquid crystal display device of claim 1, wherein, the step of producing the plurality of liquid crystal panels comprises a step of injecting the mixture in between the front substrate and the rear substrate after attaching together the first mother substrate and the second mother substrate.

7. The method of producing a liquid crystal display device of claim 6, wherein the step of producing the plurality of liquid crystal panels comprises:
   a step of introducing a sealant on at least one of the front substrate and the rear substrate in a shape that is closed except in an injection inlet, before attaching together the first mother substrate and the second mother substrate; and
   a step of sealing the injection inlet after injecting the mixture in between the front substrate and the rear substrate.

8. The method of producing a liquid crystal display device of claim 6, wherein the step of producing the plurality of liquid crystal panels comprises, after attaching together the first mother substrate and the second mother substrate and before injecting the mixture between the front substrate and the rear substrate, a step of cutting the first mother substrate and the second mother substrate apart so as to include the front substrate and rear substrate corresponding to a number of liquid crystal panels among the plurality of liquid crystal panels.

9. The method of producing a liquid crystal display device of claim 1, wherein there is a smaller number of additional terminals than the number of check terminals electrically connected to the additional terminals.

10. The method of claim 1, wherein the liquid crystal display device includes a driver, and the check terminal, the additional terminal, and the driver are provided along one side of the rear substrate.

* * * * *